(12) United States Patent
Muthiah et al.

(10) Patent No.: US 10,635,343 B2
(45) Date of Patent: Apr. 28, 2020

(54) STREAMED PROGRAM COMMANDS WITH PERIODIC GARBAGE COLLECTION

(71) Applicant: Western Digital Technologies, Inc., San Jose, CA (US)

(72) Inventors: Ramanathan Muthiah, Bangalore (IN); Balaji Thraksha Venkataramanan, Bangalore (IN); Ramkumar Ramamurthy, Bangalore (IN); Ravi Gaja, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 160 days.

(21) Appl. No.: 15/829,870

(22) Filed: Dec. 1, 2017

(65) Prior Publication Data

US 2019/0171389 A1    Jun. 6, 2019

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .......... *G06F 3/0652* (2013.01); *G06F 3/0608* (2013.01); *G06F 3/0679* (2013.01)

(58) Field of Classification Search
CPC ............... G06F 3/0652; G06F 12/0253; G06F 12/0879; G06F 13/28
USPC .......................................................... 711/103
See application file for complete search history.

(56) References Cited

U.S. PATENT DOCUMENTS 8,631,188 B1    1/2014  Heath et al.
2015/0301763 A1*  10/2015  Shaharabany ........ G06F 3/0613
                                                        711/115

* cited by examiner

*Primary Examiner* — Edward J Dudek, Jr.
*Assistant Examiner* — Sidney Li
(74) *Attorney, Agent, or Firm* — Kunzler Bean & Adamson, PC

(57) ABSTRACT

Apparatuses, systems, methods, and computer program products for streamed program commands with periodic garbage collection are disclosed. A controller is configured to set up a data path between the controller and a memory device to initialize an open mode. A controller is configured to perform a plurality of program operations on a memory device in an open mode using a same set up data path. A controller is configured to, in response to exiting an open mode, perform a garbage collection operation on a memory device.

20 Claims, 14 Drawing Sheets

STREAMED PROGRAM COMMANDS WITH PERIODIC GARBAGE COLLECTION

TECHNICAL FIELD

The present disclosure, in various embodiments, relates to computing devices and more particularly relates to streamed program commands with periodic garbage collection.

BACKGROUND

Some memory devices send write commands (e.g., program commands) only after earlier write commands are completed. That is, write commands are typically sent and completed in series, one by one, even though it can take the same amount of time to perform multiple write commands in parallel or at the same time.

Further, after completing each write command, contemporary memory devices perform garbage collection (GC) operations to ensure that memory space is available in a memory device for future write commands. As such, GC operations are often performed on a memory device when the memory device includes sufficient available memory space for servicing future write commands. Accordingly, because contemporary memory devices perform write commands in series and perform GC operations more often than may be necessary, contemporary memory devices are not as efficient as they otherwise could be.

SUMMARY

Various embodiments include apparatuses, systems, methods, and computer program products for streamed program commands with periodic garbage collection. In one embodiment, an apparatus includes a controller for a memory device. A controller, in certain embodiments, is configured to set up a data path between the controller and a memory device to initialize an open mode. A controller, in some embodiments, is configured to perform a plurality of program operations on a memory device in an open mode using a same set up data path. In response to exiting an open mode, in one embodiment, a controller is configured to perform a garbage collection operation on a memory device.

A system, in various embodiments, includes a memory device and a controller. A memory device, in one embodiment, includes a memory array of memory elements and a set of memory latches for the memory array. A controller, in certain embodiments, includes a controller memory. In one embodiment, a controller is in communication with a host computing device. A controller, in some embodiments, is configured to receive memory commands including program data from a host computing device. In a further embodiment, a controller is configured to transmit program data to one or more memory latches of a set of memory latches in a streaming write mode. A controller, in one embodiment, is configured to, in response to detecting one or more trigger events, exit a streaming write mode and, in response to exiting the streaming write mode, perform a garbage collection operation on a memory array.

Other apparatuses for streamed program commands with periodic garbage collection are disclosed. In one embodiment, an apparatus includes means for transmitting program data to one or more memory latches of a set of memory latches for a memory array in an open mode. An apparatus, in a further embodiment, includes means for exiting an open mode in response to detecting one or more trigger events. In certain embodiments, an apparatus includes means for performing a garbage collection operation on a memory array in response to exiting the open mode.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
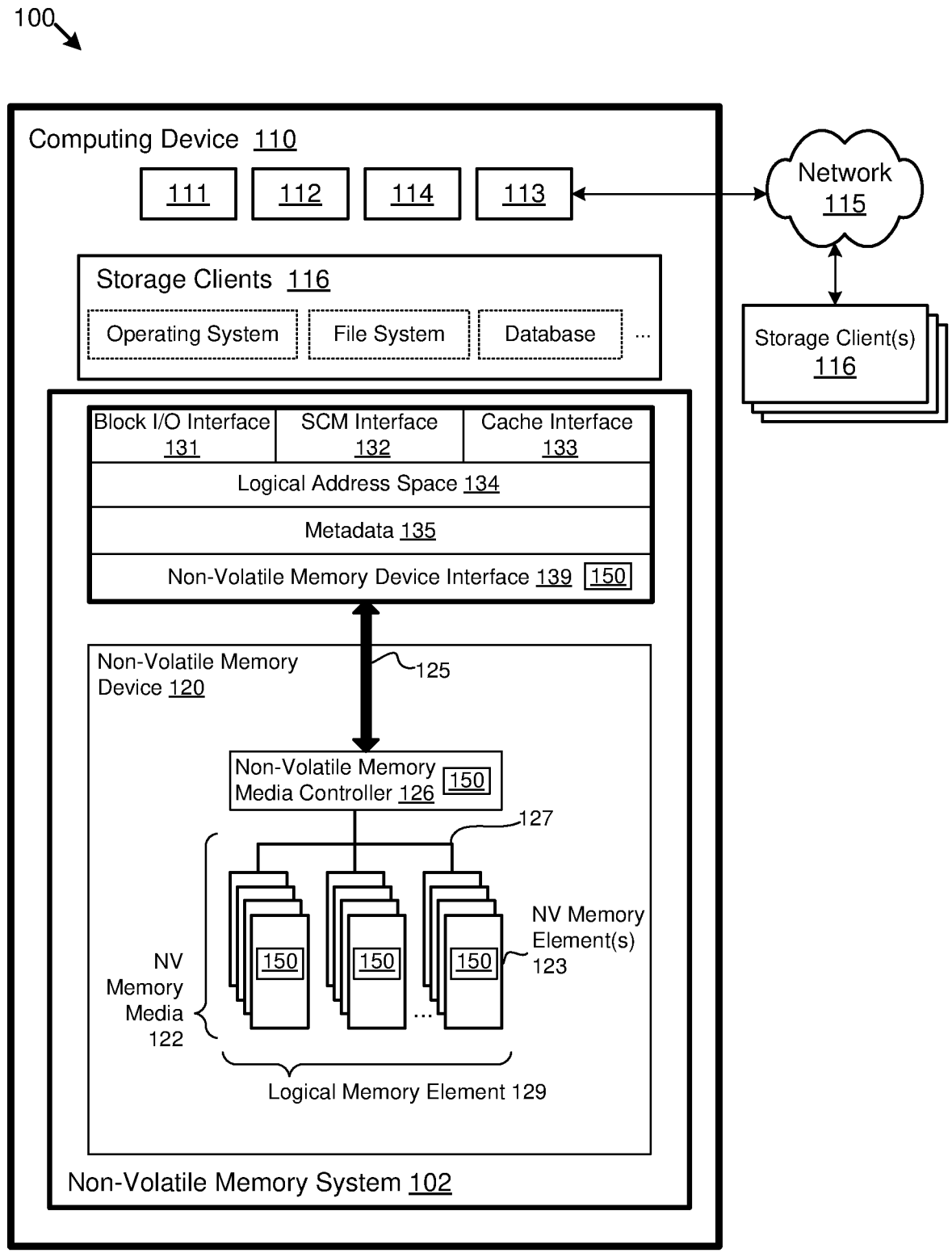
FIG. 1A is a schematic block diagram illustrating one embodiment of a system including garbage collection for streamed writes.

Aspects of the present disclosure may be embodied as an apparatus, system, method, or computer program product. Accordingly, aspects of the present disclosure may take the form of an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodiment on one or more non-transitory computer-readable storage media storing computer-readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 including a streamed write component 150 for a controller 126 of a non-volatile memory device 120. The streamed write component 150 may be part of and/or in communication with a controller 126, a non-volatile memory element 123, a device driver, or the like. The streamed write component 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer-readable storage medium 114. The computer-readable storage medium 114 may comprise executable instructions configured to cause the computing device 110 (e.g., processor 111) to perform steps of one or more of the methods disclosed herein. Alternatively, or in addition, the latch assignment component 150 may be embodied as one or more computer-readable instructions stored on the non-transitory storage medium 114.

The non-volatile memory system 102, in the depicted embodiment, includes a streamed write component 150. The streamed write component 150, in one embodiment, is configured to stream write commands and perform garbage collection (GC) operations to facilitate storage and/or memory operations performed by a controller, as described below. The streamed write component 150, in certain embodiments, initiates and/or enters an open mode to queue write commands until a predetermined quantity of write commands are accumulated. In response to accumulating the predetermined quantity of write commands, the streamed write component 150 can transmit program data to one or more data latches for temporary storage in preparation for eventually storing the program data in memory. In response to a data latch becoming full and/or storing greater than or equal to a predetermined amount (e.g., a latch amount) of the program data, the streamed write component 150 can issue a write command to the data latch to transmit the program data stored therein to memory.

In addition, a streamed write component 150 can exit the open mode in response to detecting one or more trigger events. Upon exiting the open mode, a stream write component 150 can perform GC operations to free and/or create additional memory space in a memory device. The streamed write component 150, in response to completing the GC operations, re-initiates and/or re-enters the open mode to continue performing streamed write operations. Thus, the streamed write component 150 can provide garbage collection for streamed writes to facilitate performance of various memory and/or storage operations by a controller.

In one embodiment, the streamed write component 150 may comprise logic hardware of one or more non-volatile memory devices 120, such as a controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the streamed write component 150 may comprise executable software code, such as a device driver or the like, stored on the computer-readable storage medium 114 for execution on the processor 111. In a further embodiment, the streamed write component 150 may include a combination of both executable software code and logic hardware.

In one embodiment, the streamed write component 150 is configured to receive I/O requests from a device driver or other executable application via a bus 125 or the like. The streamed write component 150 may be further configured to transfer data to/from a device driver and/or storage clients 116 via the bus 125. Accordingly, the streamed write component 150, in some embodiments, may comprise and/or be in communication with one or more direct memory access (DMA) modules, remote DMA modules, bus controllers, bridges, buffers, and so on to facilitate the transfer of memory/storage requests and storage operations of associated program data. In another embodiment, the streamed write component 150 may receive storage requests as an API call from a storage client 116, as an IO-CTL command, or the like.

According to various embodiments, a controller 126 in communication with one or more streamed write components 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more memory elements 123 of non-volatile memory media 122, which may include, but is not limited to: random access memory (RAM), resistive RAM (ReRAM), Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape, etc.), optical storage media, and/or the like, among other devices that are possible and contemplated herein. The one or more memory elements 123 of non-volatile memory media 122, in certain embodiments, comprise storage class memory (SCM).

While legacy technologies, such as NAND flash, may be block and/or page addressable, storage class memory, in one embodiment, is byte addressable. In further embodiments, SCM may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, and/or the like. Further, the non-volatile memory device 120, in various embodiments, may comprise a non-volatile recording device, a non-volatile memory device, a non-volatile storage device, and/or the like.

The non-volatile memory media 122 may comprise one or more non-volatile memory elements 123, which may include, but are not limited to: chips, packages, planes, die, and/or the like. A controller 126 may be configured to manage data operations on the non-volatile memory media 122, and may comprise one or more processors, programmable processors (e.g., FPGAs), ASICs, micro-controllers, or the like. In some embodiments, the controller 126 is configured to store data on and/or read data from the non-volatile memory media 122, to transfer data to/from the non-volatile memory device 120, and so on.

The controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library.

A device driver may be further configured to provide a cache interface 133 for caching data using the non-volatile memory system 102. A device driver may further comprise a non-volatile memory device interface 139 that is configured to transfer data, commands, and/or queries to the controller 126 over a bus 125, as described above.

Figure 1B:
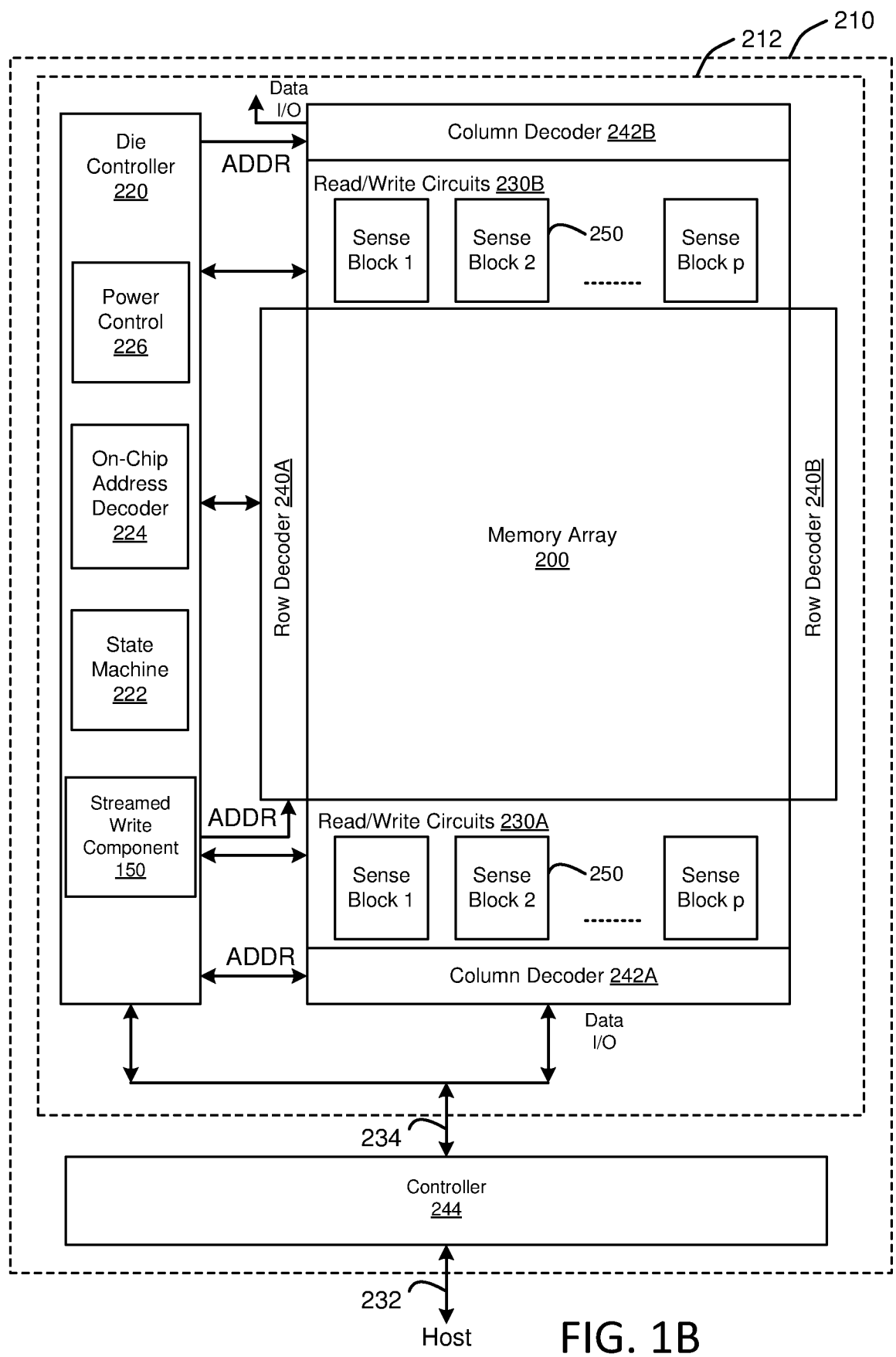
FIG. 1B is a schematic block diagram illustrating another embodiment of a system including garbage collection for streamed writes.

FIG. 1B illustrates an embodiment of a non-volatile storage device 210 that may include one or more memory die and/or chips 212. Memory die 212, in some embodiments, includes an array (e.g., two-dimensional (2D), three dimensional (3D), etc.) of memory cells 200, die controller 220, and read/write circuits 230A/230B. In one embodiment, access to the memory array 200 by various peripheral circuits is implemented in a symmetric fashion, on opposite sides of the array, so that the densities of access lines and circuitry on each side are reduced by half. The read/write circuits 230A/230B, in a further embodiment, can include multiple sense blocks 250 that allow a page of memory cells to be read and/or programmed in parallel.

The memory array 200, in various embodiments, is addressable using word lines via row decoders 240A/240B and using bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Die controller 220, in one embodiment, cooperates with the read/write circuits 230A/230B to perform memory operations on the memory array 200. The die controller 220, in certain embodiments, includes a streamed write component 150, a state machine 222, and an on-chip address decoder 224. In one embodiment, the state machine 222 comprises at least a portion of the streamed write component 150. In a further embodiment, the controller 244 comprises at least a portion of the streamed write component 150. In various embodiments, one or more of the sense blocks 250 comprises at least a portion of the streamed write component 150. The streamed write component(s) 150 discussed with reference to FIG. 1B may be similar to the streamed write component(s) 150 discussed with reference to FIG. 1A.

The state machine 222, in one embodiment, provides chip-level control of memory operations. The on-chip address decoder 224 provides an address interface to convert between the address that is used by the host or a memory controller to the hardware address used by the decoders 240A, 240B, 242A, and 242B. In certain embodiments, the state machine 222 includes an embodiment of the streamed write component 150. The streamed write component 150, in certain embodiments, is embodied as software in a device driver, hardware in a controller 244, and/or hardware in a die controller 220 and/or state machine 222. In one embodiment, one or any combination of die controller 220, streamed write component 150, decoder circuit 224, state machine circuit 222, decoder circuit 242A, decoder circuit 242B, decoder circuit 240A, decoder circuit 240B, read/write circuits 230A, read/write circuits 230B, and/or controller 244 can be referred to as one or more managing circuits.

Figure 2:
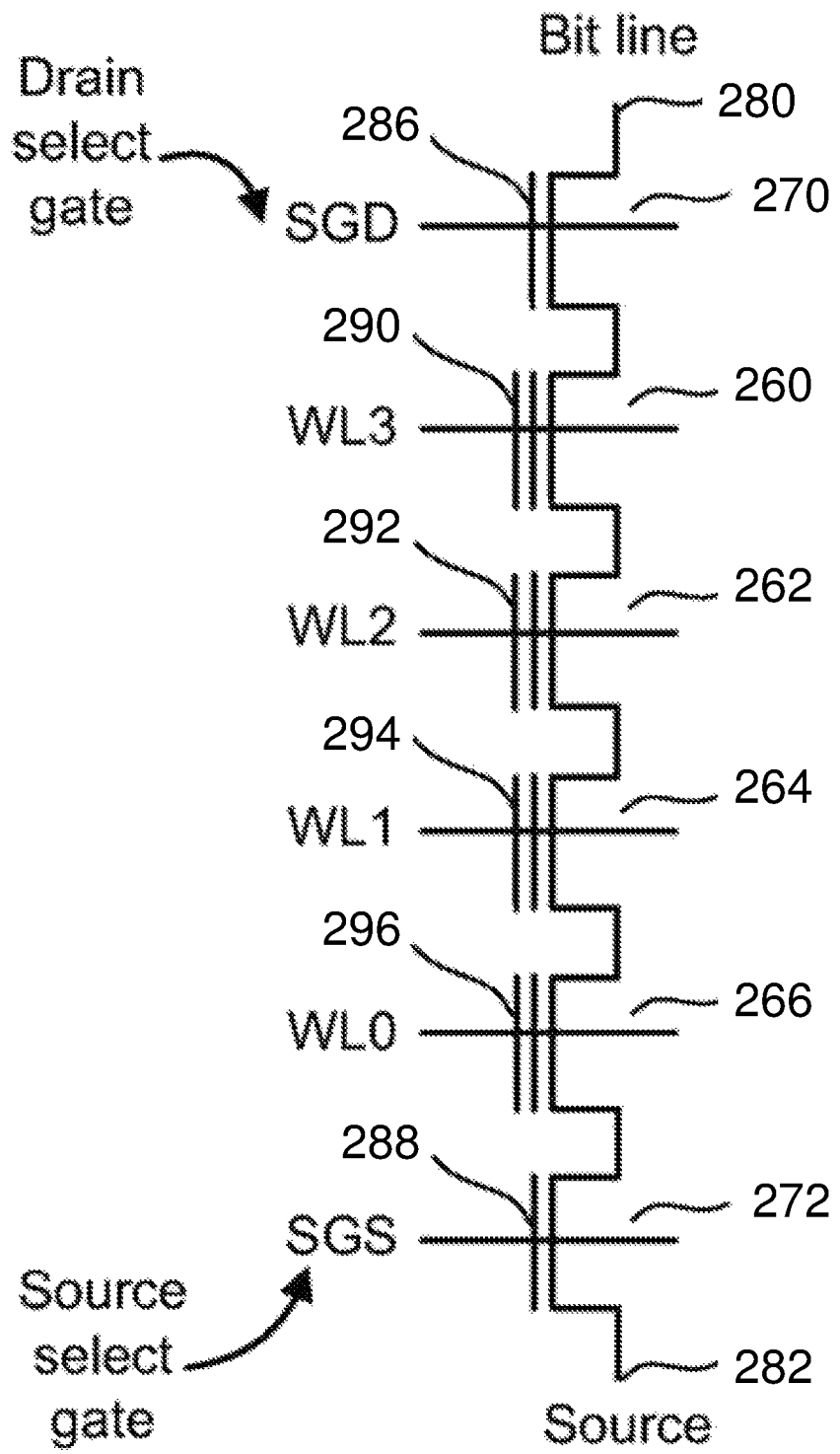
FIG. 2 is a schematic block diagram illustrating one embodiment of a string of storage cells.

FIG. 2 depicts one embodiment of a NAND string comprising a plurality of storage elements. The NAND string depicted in FIG. 2, in some embodiments, includes four transistors 260, 262, 264, and 266 connected in series and located between a first select transistor 270 and a second select transistor 272. In some embodiments, a transistor 260, 262, 264, and 266 includes a control gate and a floating gate. A control gate 290, 292, 294, and 296, in one embodiment, is connected to, or comprises a portion of, a word line. In a further embodiment, a transistor 260, 262, 264, and 266 is a storage element, storage cell, or the like, also referred to as a memory cell. In some embodiments, a storage element may include multiple transistors 260, 262, 264, and 266.

The first select transistor 270, in some embodiments, gates/connects the NAND string connection to a bit line 280 via a drain select gate SGD. The second select transistor 272, in certain embodiments, gates/connects the NAND string connection to a source line 282 via a source select gate SGS. The first select transistor 270, in a further embodiment, is controlled by applying a voltage to a corresponding select gate 286. The second select transistor 272, in some embodiments, is controlled by applying a voltage to corresponding select gate 288.

As shown in FIG. 2, the source line 282, in one embodiment, is connected to the sources of each transistor/storage cell 260, 262, 264, and 266 in the NAND string. The NAND string, in some embodiments, may include some storage elements 260, 262, 264, and 266 that have been programmed and some storage elements 260, 262, 264, and 266 that have not been programmed. As described in more detail below, the streamed write component 150 controls whether portions of a storage device, such as a NAND string, are used for memory and/or storage operations.

Figure 3:
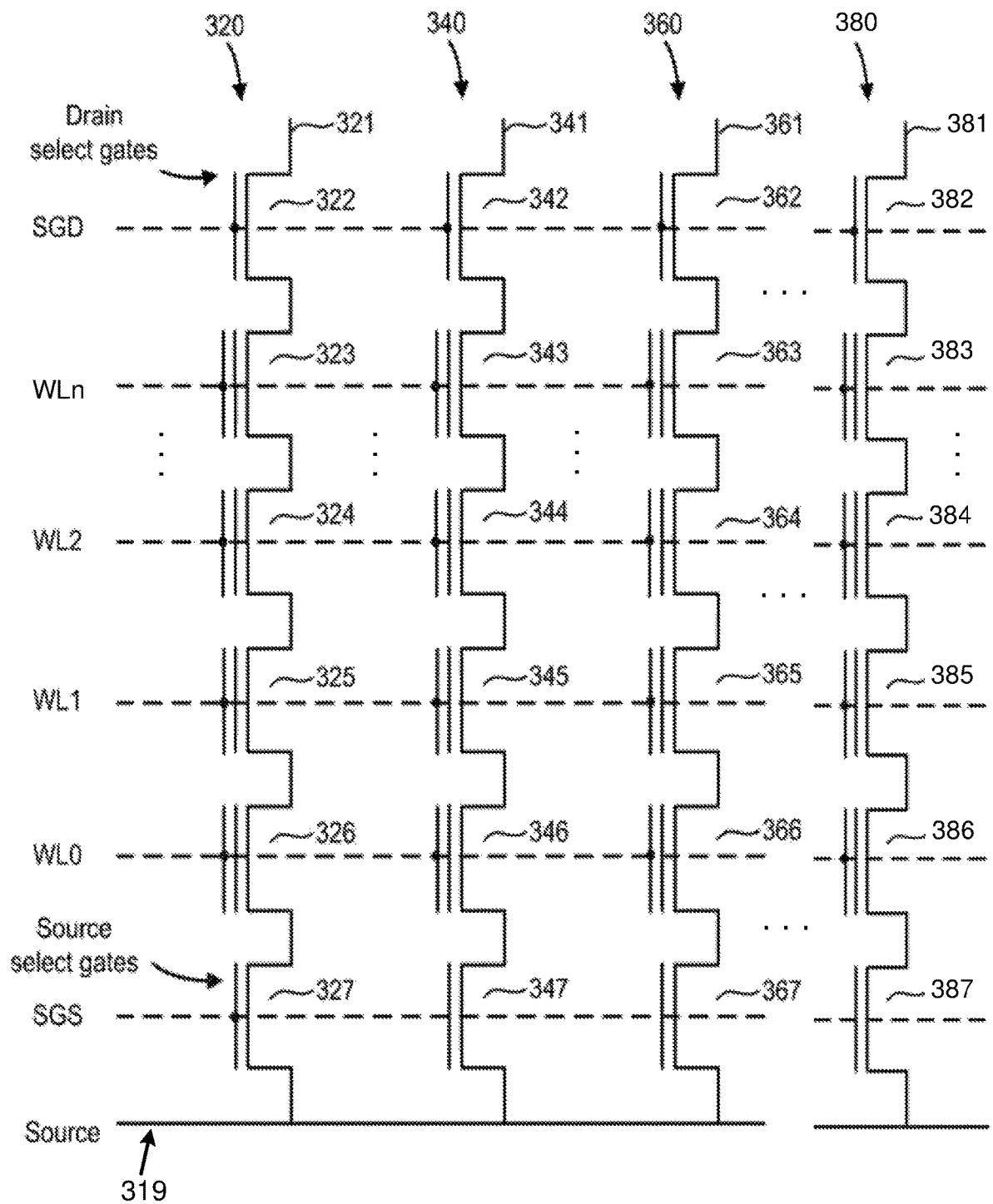
FIG. 3 is a schematic block diagram illustrating one embodiment of an array of storage cells.

FIG. 3 is a circuit diagram depicting a plurality of NAND strings 320, 340, 360, and 380. The architecture for a flash memory system using a NAND structure may include several NAND strings 320, 340, 360, and 380. For example, FIG. 3 illustrates NAND strings 320, 340, 360, and 380 in a memory array 200 that includes multiple NAND strings 320, 340, 360, and 380. In the depicted embodiment, each NAND string 320, 340, 360, and 380 includes drain select transistors 322, 342, 362, and 382, source select transistors 327, 347, 367, and 387, and storage elements 323-326, 343-346, 363-366, and 383-386. While four storage elements 323-326, 343-346, 363-366, and 383-386 per NAND string 320, 340, 360, and 380 are illustrated for simplicity, some NAND strings 320, 340, 360, and 380 can include any number of storage elements (e.g., thirty-two, sixty-four, or the like storage elements, among other storage elements that are possible and contemplated herein).

NAND strings 320, 340, 360, and 380, in one embodiment, are connected to a source line 319 by source select transistors 327, 347, 367, and 387. A selection line SGS may be used to control the source side select transistors. The various NAND strings 320, 340, 360, and 380, in one embodiment, are connected to bit lines 321, 341, 361, 381 by drain select transistors 322, 342, 362, and 382. The drain select transistors 322, 342, 362, and 382 may be controlled by a drain select line SGD. In some embodiments, the select lines do not necessarily need to be in common among the NAND strings 320, 340, 360, and 380; that is, different select lines can be provided for different NAND strings 320, 340, 360, and 380.

As described above, each word line WL0-WLn comprises one or more storage elements 323-383, 324-384, 325-385, and 326-386. In the depicted embodiment, each bit line 321, 341, 361, 381 and the respective NAND string 320, 340, 360, and 380 comprise the columns of the memory array 200, storage block, erase block, or the like. The word lines WL0-WLn, in some embodiments, comprise the rows of the memory array 200, storage block, erase block, or the like. Each word line WL0-WLn, in some embodiments, connects the control gates of each storage element 323-383, 324-384, 325-385, and 326-386 in a row. Alternatively, the control gates may be provided by the word lines WL0-WLn themselves. In some embodiments, a word line WL0-WLn may include tens, hundreds, thousands, millions, or the like of storage elements 323-383, 324-384, 325-385, and 326-386.

In one embodiment, each storage element 323-326, 343-346, 363-366, and 383-386 is configured to store data. For example, when storing one bit of digital data, the range of possible threshold voltages ("VTH") of each storage element 323-326, 343-346, 363-366, and 383-386 may be divided into two ranges that are assigned logical data "1" and "0." In one example of a NAND type flash memory, the VTH may be negative after the storage elements 323-326, 343-346, 363-366, and 383-386 are erased, and defined as logic "1." In one embodiment, the VTH after a program operation is positive and defined as logic "0."

When the VTH is negative and a read is attempted, in some embodiments, storage elements 323-326, 343-346, 363-366, and 383-386 will turn on to indicate logic "1" is being stored. When the VTH is positive and a read operation is attempted, in a further embodiment, a storage element will not turn on, which indicates that logic "0" is stored. Each storage element 323-383, 324-384, 325-385, and 326-386 may also store multiple levels of information, for example, multiple bits of digital data. In such an embodiment, the range of VTH value is divided into the number of levels of data. For example, if four levels of information can be stored in each storage element 323-326, 343-346, 363-366, and 383-386, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage elements 323-326, 343-346, 363-366, and 383-386 and the threshold voltage ranges of the storage elements 323-326, 343-346, 363-366, and 383-386 depends upon the data encoding scheme adopted for the storage elements 323-326, 343-346, 363-366, and 383-386.

In some embodiments, portions of the storage elements 323-326, 343-346, 363-366, and 383-386 may be defective. In such an embodiment, the latch assignment component 150 may manage which portions of the storage elements 323-326, 343-346, 363-366, and 383-386 are used for operations.

Figure 4:
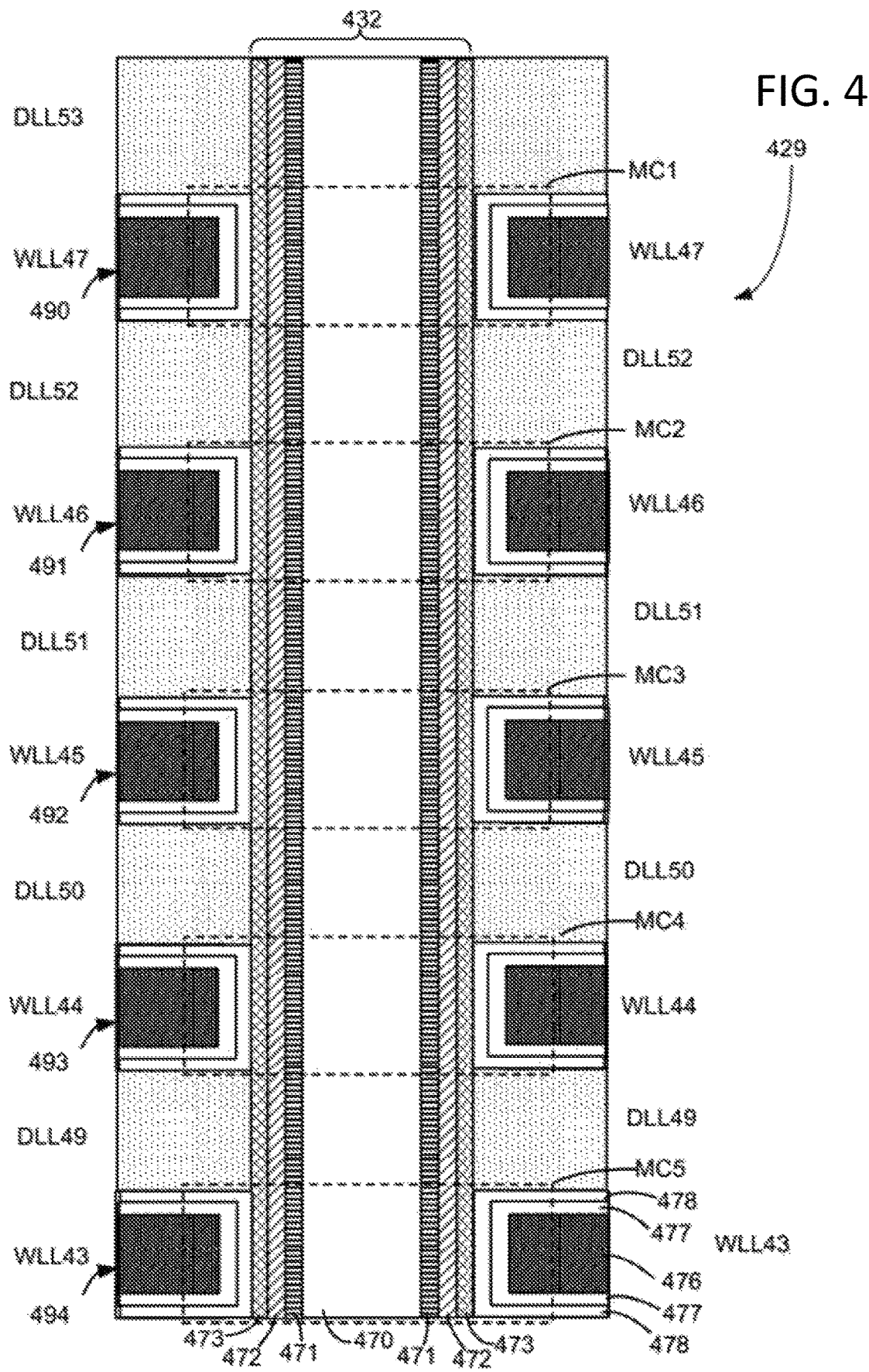
FIG. 4 is a schematic block diagram illustrating one embodiment of a three-dimensional (3-D), vertical NAND flash memory structure.

FIG. 4 illustrates one embodiment of a cross-sectional view of a 3D, vertical NAND flash memory structure 429 or string 429. In one embodiment, the vertical column 432 is round and includes four layers; however, in other embodiments more or less than four layers can be included and other shapes can be used (e.g., a "U" shape instead of an "I" shape or the like). In one embodiment, a vertical column 432 includes an inner core layer 470 that is made of a dielectric, such as SiO2. Other materials can also be used. Surrounding inner core 470 is polysilicon channel 471. Materials other than polysilicon can also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is a shared charge-trapping layer 473, such as (for example) Silicon Nitride. Other materials and/or structures can also be used. That is, the technology discussed herein is not limited to any particular material and/or structure.

As shown, FIG. 4 depicts dielectric layers DLL49, DLL50, DLL51, DLL52 and DLL53, as well as word line layers WLL43, WLL44, WLL45, WLL46, and WLL47. Each of the word line layers includes a word line region 476 surrounded by an aluminum oxide layer 477, which is surrounded by a blocking oxide (SiO2) layer 478. The physical interaction of the word line layers with the vertical column forms the memory cells. Thus, a memory cell, in one embodiment, comprises channel 471, tunneling dielectric 472, charge-trapping layer 473 (e.g., shared with other memory cells), blocking oxide layer 478, aluminum oxide layer 477 and word line region 476. In some embodiments, the blocking oxide layer 478 and aluminum oxide layer 477, may be replaced by a single layer of material with insulating properties or by more than 2 layers of different material with insulating properties. Furthermore, the materials used are not limited to silicon dioxide (SiO2) or aluminum oxide. For example, word line layer WLL47 and a portion of vertical column 432 comprise a memory cell MC1. Word line layer WLL46 and a portion of vertical column 432 comprise a memory cell MC2. Word line layer WLL45 and a portion of vertical column 432 comprise a memory cell MC3. Word line layer WLL44 and a portion of vertical column 432 comprise a memory cell MC4. Word line layer WLL43 and a portion of vertical column 432 comprise a memory cell MC5. In other architectures, a memory cell may have a different structure; however, the memory cell would still be the storage unit.

When a memory cell is programmed, electrons are stored in a portion of the charge-trapping layer 473 that is associated with the memory cell. These electrons are drawn into the charge-trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming is achieved through Fowler-Nordheim tunneling of the electrons into the charge-trapping layer. During an erase operation, the electrons return to the channel or holes are injected into the charge-trapping layer to recombine with electrons. In one embodiment, erasing is achieved using hole injection into the charge-trapping layer via a physical mechanism such as gate induced drain leakage (GIDL).

Storage cells in the same location or position in different memory structures 429 (e.g., different NAND strings 429) on different bit lines, in certain embodiments, may be on the same word line. Each word line may store one page of data, such as when 1-bit of data is stored per cell (SLC); two pages of data, such as when 2-bits of data are stored per cell (MLC); three pages of data, such as when 3-bits of data are stored per cell (TLC); four pages of data, such as when 4-bits of data are stored per cell (QLC); or another number of pages of data.

In the depicted embodiment, a vertical, 3D NAND flash memory structure 429 comprises an "I" shaped memory structure 429. In other embodiments, a vertical, 3D NAND flash memory structure 429 may comprise a "U" shaped structure, or may have another vertical and/or stacked architecture. In certain embodiments, four sets of strings 429 (e.g., four sets of 48 word lines, or another predefined number of word lines) may form an erase block, while in other embodiments, fewer or more than four sets of strings 429 may form an erase block. As may be appreciated, any suitable number of storage cells may be part of a single string 429. In one embodiment, a single string 429 includes 48 storage cells.

Figure 5:
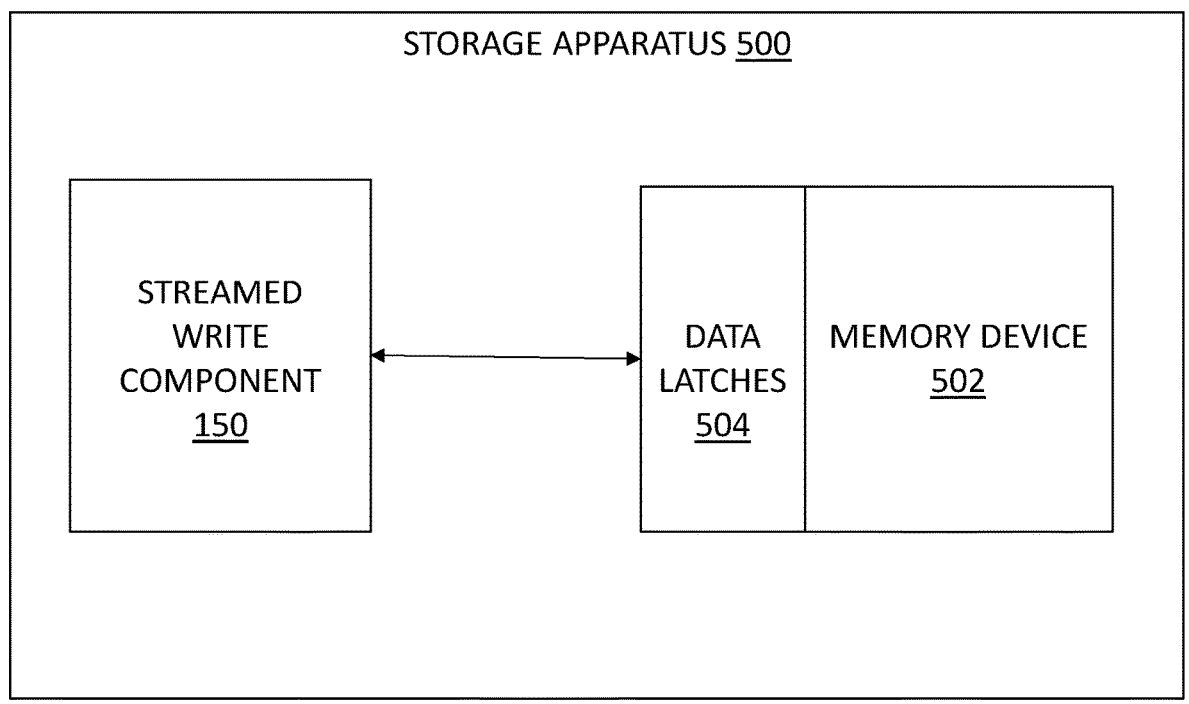
FIG. 5 is a schematic diagram of one embodiment of a storage apparatus providing garbage collection for streamed writes.

FIG. 5 is a schematic diagram of one embodiment of a storage apparatus 500 providing garbage collection for streamed writes. At least in the illustrated embodiment, the storage apparatus 500 includes, among other components, a memory device 502, a set of data latches 504 coupled to and/or in communication with the memory device 502, and a streamed write component 150 coupled to and/or in communication with the set of data latches 504.

A memory device 502 may include any suitable system and/or apparatus that is known or developed in the future that is capable of storing program data. In various embodiments, the memory device 502 may be similar to the non-volatile memory device 120, the non-volatile storage device 210, the non-volatile memory element(s) 123, and/or the memory array 200, etc. discussed elsewhere herein, among other suitable systems and/or apparatus that are possible and contemplated herein.

In various embodiments, a memory device 502 may include two or more different types of memory cells. In some embodiments, a memory device may include sets of single level cells (SLCs) 506 and sets of multilevel cells 508, which can include two-level cells (MLCs), three-level cells (TLCs), and/or four-level cells (QLCs), etc., among other types of memory devices that are possible and contemplated herein.

To increase speed and/or decrease latency, various embodiments of a memory device 502 can have program data written initially to one or more blocks or sets of SLCs 506 (referred to herein as host write block(s) or host write sets of SLCs 506) because program data can be written to SLCs 506 faster than to multilevel cells 508 (e.g., MLCs, TLCs, and QLCs). Other embodiments, may have program data written initially to one or more of its blocks or sets of multilevel cells 508.

Further, to leverage the storage capacity advantages of multilevel cells 508, various embodiments of a memory device 502 can relocate and/or migrate program data that is stored in an SLC 506 to a multilevel cell 508 (e.g., MLCs, TLCs, and QLCs) using a process referred to as folding. In a non-limiting example, among other examples that are possible and contemplated herein, a folding process can relocate three pages of program data stored in a block or set of SLCs 506 to one page in a block or set of multilevel cells 508 (a block or set of TLCs in this example) since a TLC can include triple the storage capacity of an SLC 506. Corresponding storage capacity gains compared to SLCs 506 are possible with MLCs (e.g., twice the storage capacity) and QLCs (e.g., four times the storage capacity).

Folding operations, in some embodiments, may include relocating program data from SLCs 506 to multilevel cells 508 may be performed in background operations and/or foreground operations. In various embodiments, folding operations to free memory space in a block or set of SLCs 506 for new program data may be initiated in response to a set of SLCs 506 being full, substantially full, and/or storing greater than or equal to a predetermined threshold percentage and/or quantity of program data. Further, folding operations may continue until a block or set of SLCs 506 is no longer full, substantially full, and/or storing greater than or equal to a predetermined threshold percentage and/or quantity of program data, is storing less than a predetermined quantity or percentage of program data, and/or includes greater than a predetermined quantity or percentage of available memory space and/or SLCs 506. In other embodiments, folding operations may be performed continuously, substantially continuously, and/or periodically.

In additional or alternative embodiments, folding operations may include relocating program data from one or more cells of a first layer to one or more cells of another layer in a memory of multilevel cells 508, which may be performed in background and/or foreground operations. The block or set of cells on the new layer of the multilevel cells 508 storing the relocated program data can be referred to as a fold destination block or fold destination set. Further, because the new layer including a fold destination block is a single layer of the memory of multilevel cells 508, the layer can be considered and/or treated similar to an SLC 506 for folding operation purposes. A trigger event may occur in response to a fold destination block becoming full, substantially full, and/or storing greater than or equal to a predetermined threshold percentage and/or quantity of program data, which can trigger exiting open mode operations and/or initiate GC operations, as discussed elsewhere herein.

Figure 6:
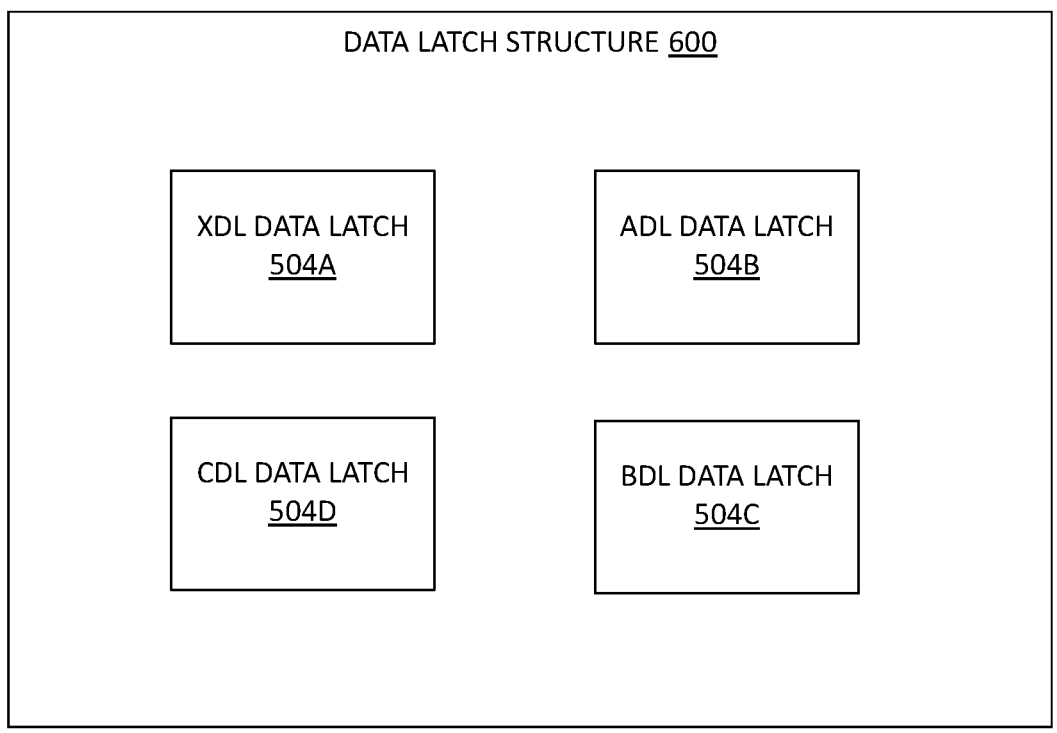
FIG. 6 is a schematic diagram of an embodiment of a data latch structure in a memory in the systems of FIG. 1A and/or FIG. 1B and/or the storage apparatus of FIG. 5.

With reference to FIG. 6, FIG. 6 illustrates one embodiment of a set of data latches 504 of a data latch structure 600. A data latch 504 may include any structure that can at least temporarily store data during the performance of memory operations and/or storage operations between one or more components (e.g., by a memory controller 126, a controller 244, a die controller 220, and/or streamed write component(s) 150, and/or the like) and a memory device (e.g., the memory device 502, the non-volatile memory device 120, the non-volatile storage device 210, the non-volatile memory element(s) 123, and/or memory array 200, and/or the like).

At least in the illustrated embodiment, a set of data latches 504 includes, among other components, a data latch 504A, a data latch 504B, a data latch 504C, and a data latch 504D (also simply referred to individually, in various groups, or collectively, as data latch 504 or data latches 504). In some embodiments, a data latch 504A includes a transfer data latch (also referred to as a data latch XDL or XDL 504A), a data latch 504B includes a data latch A (also referred to as a data latch ADL or ADL 504B), a data latch 504C includes a data latch B (also referred to as a data latch BDL or BDL 504C), and a data latch 504D includes a data latch C (also referred to as a data latch CDL or CDL 504D). In various embodiments, an XDL 504A stores user data, an ADL 504B stores a lower page (LP) of data, a BDL 504C stores a middle page (MP) of data, and a CDL 504D stores an upper page (UP) of data, although other configurations are possible and contemplated herein.

In some embodiments, the XDL 504A, ADL 504B, BDL 504C, and CDL 504D may be included as separate devices and/or form at least a portion of the non-volatile memory elements 123 and can provide intermediate data storage between the memory controller 126 and the NV memory media 122 (see e.g., FIG. 1A). In additional or alternative embodiments, the XDL 504A, ADL 504B, BDL 504C, and CDL 504D may be included as separate devices and/or form at least a portion of read/write circuits 230A and/or 230B and can provide intermediate data storage between the controller 244 and the memory array 200 (see e.g., FIG. 1B).

While the various embodiments discussed herein disclose the inclusion and/or use of a set of data latches 504, the scope of the various embodiments is/are not limited to a data latch 504. That is, other embodiments contemplate the inclusion and/or use of other devices that can perform the function(s) of and/or functions similar to a data latch 504. Non-limiting examples of such devices include, but are not limited to, flip-flops, registers, RAM or other volatile memory, timers, oscillators, and/or multivibrators, or the like, among other devices and/or circuits that are possible and contemplated herein.

Further, while a set of data latches 504 is discussed herein as including four data latches 504, the various embodiments are not limited to four data latches 504. That is, various other embodiments include a set of data latches 504 including greater than four data latches 504 and/or a set of data latches 504 including fewer than four data latches 504. In addition, while one set of data latches 504 is illustrated in FIGS. 5 and 6, other embodiments may include more than one set of data latches 504.

Figure 7A:
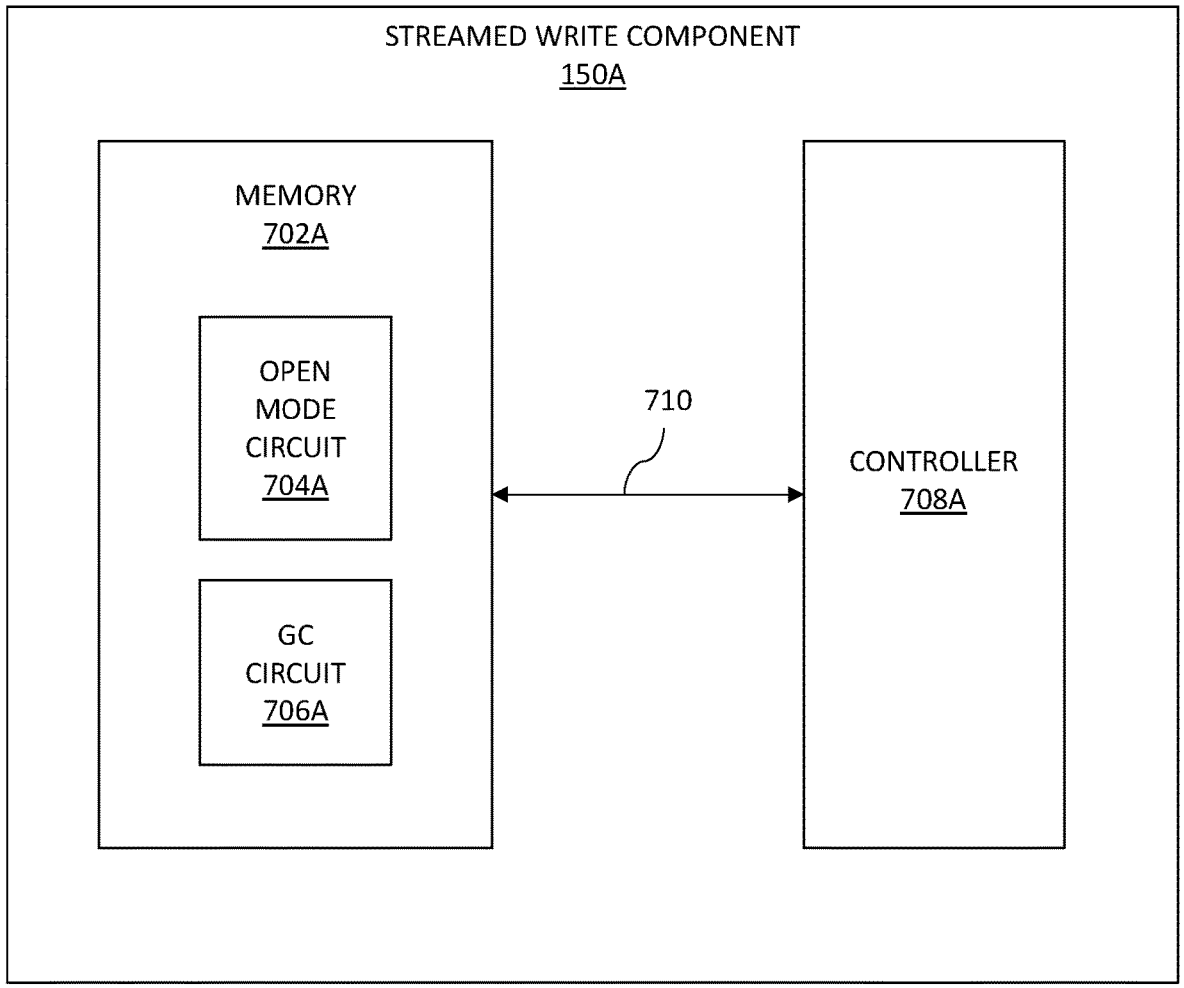
FIG. 7A is a schematic block diagram illustrating one embodiment of a streamed write component in the systems of FIG. 1A and/or FIG. 1B and/or the storage apparatus of FIG. 5.

With reference to FIG. 7A, FIG. 7A is a schematic block diagram of one embodiment of a streamed write component 150A. At least in the illustrated embodiment, the streamed write component 150A includes, among other components, a memory 702A storing an open mode circuit 704A and a GC circuit 706A coupled to and/or in communication with a controller 708A via a bus 710 (e.g., a wired and/or wireless bus).

A memory 702A may include any system and/or device that is known or developed in the future capable of storing computer-useable program data. For example, a memory 702A can be implemented as flash memory (e.g., a solid-state device (SSD) or other non-volatile storage device that stores persistent data). In various embodiments, a memory 702A may be similar to the memory device 502, the non-volatile memory device 120, the non-volatile storage device 210, the non-volatile memory element(s) 123, the memory array 200, and/or the memory device 502 that are discussed elsewhere herein, among other suitable memory systems, devices, and/or apparatus that are possible and contemplated herein.

In various embodiments, a memory 702A can include and/or store a flash translation layer 712 (FTL). An FTL 712 can include any suitable hardware and/or software that is known or developed in the future that can provide the functionality of a flash translation layer. In various embodiments, an FTL 712 can write updated program data to a new and/or empty memory location and then divert subsequent read requests to its new address, provide wear leveling operations to ensure that new program data is evenly distributed across the available memory devices/locations, and/ or keep track of old and/or invalid program data and/or memory locations so that the memory locations can be recycled for reuse, etc., among other functionality that is possible and contemplated herein.

In some embodiments, an FTL 712 can determine and/or track the quantity and/or amount of program data that is currently being stored in one or more data latches 504. In additional or alternative embodiments, an FTL 712 can track the program data that is at least temporarily stored in one or more data latches 504 of a set of data latches 504. For instance, an FTL 712 can be used to identify the program data that is stored in one or more latches 504 and/or identify which program data in the data latch/latches 504 has been written to a memory device 502 (e.g., in response to the data latch/latches 504 being full and/or including greater than or equal to a predetermined quantity/amount of program data).

An open mode circuit 704A may include any suitable hardware and/or software that is capable of receiving program commands, which can also be referred to herein as program commands. In some embodiments, an open mode circuit 704A can receive a continuous stream of program commands, although substantially continuous and/or periodic streams of program commands are possible and contemplated herein. Further, an open mode circuit 704A can also perform and/or facilitate performance of program operations corresponding to the received program commands (e.g., on a memory device 502 and/or a set of data latches 504).

Figure 7B:
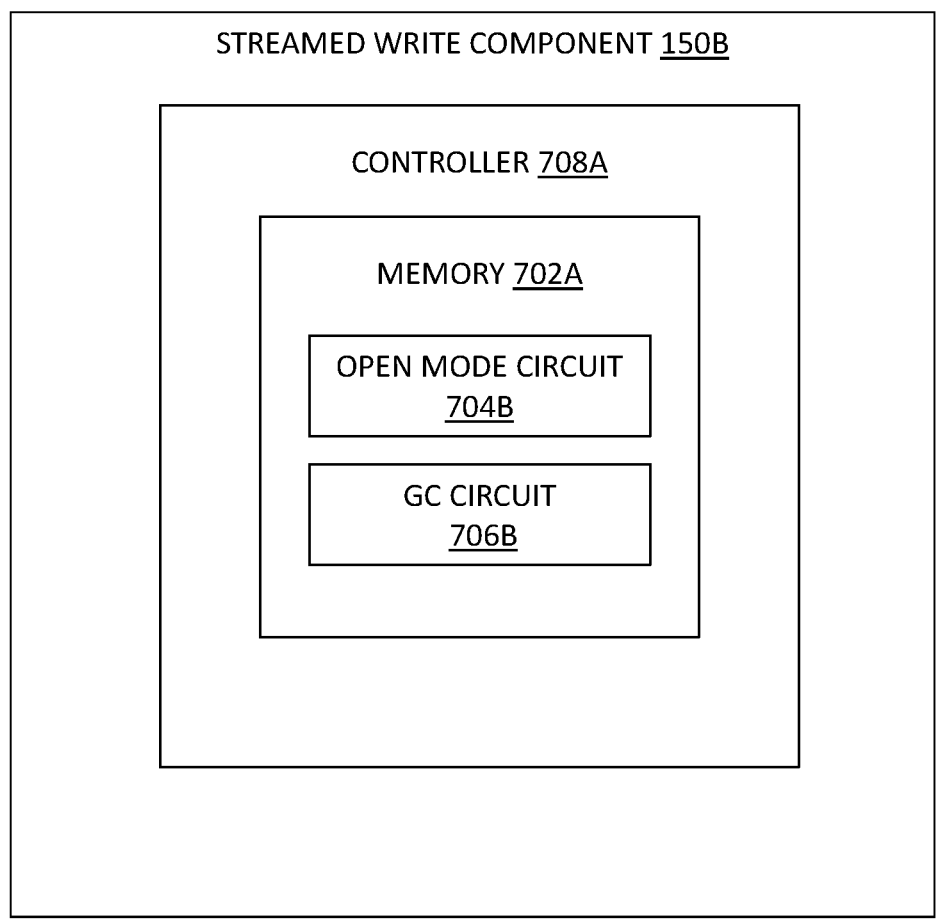
FIG. 7B is a schematic block diagram illustrating another embodiment of a streamed write component in the systems of FIG. 1A and/or FIG. 1B and/or the storage apparatus of FIG. 5.
Figure 8:
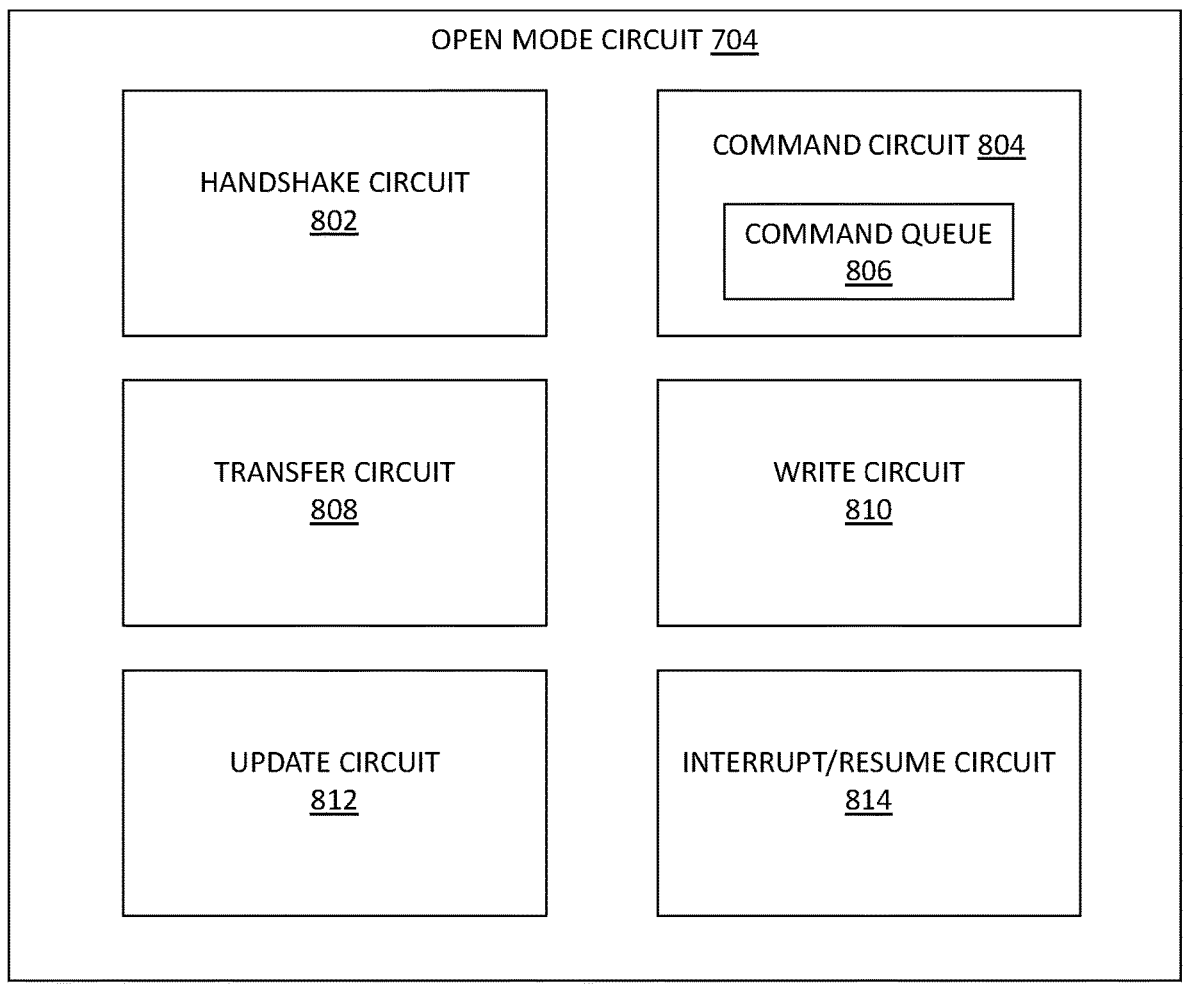
FIG. 8 is a schematic block diagram illustrating one embodiment of an open mode circuit in the streamed write component of FIG. 7A or FIG. 7B.

Referring now to FIG. 8, FIG. 8 is a schematic block diagram of one embodiment of an open mode circuit 704 (e.g., open mode circuit 704A and/or open mode circuit 704B (see FIG. 7B), which may be referred to individually or collectively as open mode circuit 704). At least in the illustrated embodiment, an open mode circuit 704 includes, among other components, a handshake circuit 802, a command circuit 804 including a command queue 806, a transfer circuit 808, a write circuit 810, an update circuit 812, and an interrupt/resume circuit 814. In various embodiments, an open mode circuit 704 is configured to perform open mode operations defined by the operations and/or functions of the handshake circuit 802, command circuit 804, command queue 806, transfer circuit 808, write circuit 810, update circuit 812, and/or interrupt/resume circuit 814.

A handshake circuit 802 may include any suitable hardware and/or software that is known or developed in the future that can initiate, allow, enable, provide, and/or facilitate communications between an open mode circuit 704 and a host computing device 110 to transmit memory/storage requests and/or commands to write, read, store, communicate, propagate, and/or transport instructions, data (e.g., program data, etc.), computer programs, software, code, routines, etc. there between, among other operations that are possible and contemplated herein. In various embodiments, a handshake circuit 802 can establish communications with a host communication device 110 so that the open mode circuit 704 can begin receiving program commands (also referred to as program requests, write commands, write requests, etc.) to write program data to a memory device 502 (through/via the data latch/latches 504).

A handshake circuit 802 can establish communications with a host communication device 110 by setting up a data path for the program data corresponding to program commands transmitted from the host communication device 110. In various embodiments, a handshake circuit 802 may set up a data path each time that communication between the open mode circuit 704 and the host communication device 110 is established. In some embodiments, communication between the open mode circuit 704 and the host communication device 110 is established subsequent to GC operations being performed on a memory device 502.

An open mode circuit 704 can begin receiving program commands subsequent to communication being established and/or re-established between an open mode circuit 704 and a host computing device 110. Further, communication between an open mode circuit 704 and a host computing device 110 can resume, be re-initiated, and/or be established subsequent to the open mode circuit 704 exiting open mode operations and/or subsequent to GC operations being performed on a memory device 502, each of which is discussed elsewhere herein.

A program command may include any suitable size that can be transmitted from a host computing device 110 and received by an open mode circuit 704. In some embodiments, the program commands include a size of about four kilobytes (4 KB), among other sizes that are possible and contemplated herein. That is, other embodiments may exchange program commands including sizes that are greater than and/or less than 4 KB.

One or more portions of a program command may include command data and one or more other portions of the program command may include program data, among other types of data that are possible and contemplated herein. Program data may include any suitable type of computer-useable (e.g., readable, writable, executable, programmable, etc.) data and/or electronic/digital information that is known or developed in the future. Examples of suitable program data and/or electronic/digital information include, but are not limited to, electronic representations of instructions, data, computer programs, software, code, routines, text, charts, graphs, tables, video, images, speech, and/or facts (e.g., words, numbers, characters, symbols, figures, characters, punctuation, descriptions, measurements, observations, etc.), among other types of program data and/or electronic/digital information that are possible and contemplated herein. In various embodiments, the program data and/or electronic information may be represented by a set of ones and zeros, which can be referred to as binary data.

A command circuit 804 may include any suitable hardware and/or software that is known or developed in the future that is capable of receiving program commands from a host computing device 110 and accumulating the program commands in a command queue 806. In various embodiments, a command circuit 804 can accumulate the received program commands as they are received. As such, a command circuit 804, in some embodiments, can continuously accumulate a stream of program commands in a command queue 806 as a result of receiving a continuous stream of program commands, although substantially continuous and/or periodic accumulation of streamed program commands are possible and contemplated herein.

A command queue 806 may be any hardware and/or software that is known or developed in the future that is capable of queuing program commands. Various embodiments of command queue 806 may include any suitable size that is known of developed in the future capable of at least temporarily storing a set of program commands and/or having program commands accumulated/placed therein. In some embodiments, a command circuit 804 may include a size of about thirty-two kilobytes (32 KB), among other sizes that are possible and contemplated herein. That is, other embodiments of a command queue 806 may include a size that is greater than or less than about 32 KB.

A command circuit 804 may accumulate and/or place any suitable quantity of program commands in a command queue 806. In some embodiments, eight write commands may be accumulated and/or placed in a command queue 806 before the command queue 806 is full, substantially full, and/or considered full (e.g., 8 program commands*4 KB=32 KB), among other quantities of program commands that are possible and contemplated herein. That is, other embodiments may accumulate and/or place greater than and/or less than eight program commands in a command queue 806 before the command queue 806 is full, substantially full, and/or considered full.

In additional or alternative embodiments, a command circuit 804 may accumulate and/or place any suitable quantity of program data corresponding to one or more program commands in a command queue 806. In some embodiments, a set of program commands totaling 32 KB of program data may be accumulated and/or placed in a command queue 806 before the command queue 806 is full, substantially full, and/or considered full, among other amounts of program data that are possible and contemplated herein. That is, other embodiments may accumulate and/or place greater than and/or less than 32 KB of program data in a command queue 806 before the command queue 806 is full, substantially full, and/or considered full.

Program commands may be queued, ordered, and/or arranged in any suitable manner that is known or developed in the future. In various embodiments, program commands may be queued with respect to the quantity and/or amount of program data in each program command (e.g., largest to smallest, smallest to largest, etc.), time of receipt (e.g., earliest to latest, latest to earliest, etc.), source device, and/or priority level, etc., among other metrics that are possible and contemplated herein.

A command circuit 804 may further include any suitable hardware and/or software that is known or developed in the future that is capable of releasing, removing, modifying, and/or deleting program commands from a command queue 806. In some embodiments, program commands may be released in response to the program commands being performed and/or program data corresponding to the program commands being written to one or more data latches 504 and/or a memory device 502.

A transfer circuit 806 may include any suitable hardware and/or software that is known or developed in the future capable of detecting and/or determining the quantity and/or amount of accumulated program commands in the command queue 806. In other words, a transfer circuit 806 can detect/determine the quantity and/or amount of program commands that are currently being stored and/or that are placed in the command queue 806.

Further, the transfer circuit 806 can determine when a command queue 806 is full, substantially full, and/or considered full. In some embodiments, a command queue 806 may be full, substantially full, and/or considered full in response to the command queue 806 queuing and/or storing greater than or equal to a predetermined and/or threshold quantity of program commands (e.g., eight program commands, among other possible quantities that are greater than and/or less than eight program commands, each of which are contemplated herein). In additional or alternative embodiments, a command queue 806 may be full, substantially full, and/or considered full in response to the command queue 806 queuing and/or storing greater than or equal to a predetermined and/or threshold amount of accumulated program commands and/or program data (e.g., program commands and/or program data totaling 32 KB of data, among other possible quantities that are greater than and/or less than 32 KB of program command data, each of which are contemplated herein).

In various embodiments, a transfer circuit 806 may further include any suitable hardware and/or software that is known or developed in the future capable of transferring and/or transmitting accumulated program commands and/or program data corresponding to the accumulated program commands to one or more data latches 504 in response to determining/detecting that the command queue 806 is full, substantially full, and/or considered full. In some embodiments, the transfer circuit 806 can transfer and/or transmit all of the accumulated program commands and/or program data corresponding to the accumulated program commands to the data latch/latches 504 at the same time, at substantially the same time, and/or two or more program commands and their corresponding program data may be transmitted/transferred at different times, among other combinations that are possible and contemplated herein. Further, program data may be transferred to the data latch/latches 504 in background and/or foreground operations.

In some embodiments, a transfer circuit 806 may transmit an acknowledgement to the host computing device 110 indicting that the program data has been written to a memory device 502 prior to actually writing the program data to the data latch/latches 504. Here, due to Write-Abort conditions, if the data in the data latch/latches 504 is lost, the host computing device 110 can identify the lost program data as being the program data included in the program command that the host computing device 110 sent after the last flush request. For this purpose, an open mode circuit 704 can at least periodically receive flush commands issued from the host computing device 110.

A write circuit 808 may include any suitable hardware and/or software that is known or developed in the future capable of detecting and/or determining the quantity and/or amount of accumulated program commands and/or program data in the data latch/latches 504. In other words, a write circuit 808 can detect/determine the quantity and/or amount of program commands and/or program data that are currently being stored in one or more of the data latches 504.

Further, the write circuit 808 can determine when one or more data latches 504 is full, substantially full, and/or considered full. In some embodiments, a data latch 504 may be full, substantially full, and/or considered full in response to the data latch 504 storing greater than or equal to a predetermined and/or threshold quantity of program commands (e.g., eight program commands, among other possible quantities that are greater than and/or less than eight program commands and that are contemplated herein). In additional or alternative embodiments, a data latch 504 may be full, substantially full, and/or considered full in response to the data latch 504 storing greater than or equal to a predetermined and/or threshold amount of program data (e.g., 32 KB of program data, among other possible quantities that are greater than and/or less than 32 KB of program data and that are contemplated herein).

In various embodiments, a write circuit 808 may further include any suitable hardware and/or software that is known or developed in the future capable of transferring, transmitting, and/or writing accumulated program commands and/or program data corresponding to the accumulated program commands to a memory device 502 from the one or more data latches 504 in response to determining/detecting that the data latch/latches 504 are full, substantially full, and/or considered full. In some embodiments, a write circuit 808 can transfer, transmit, and/or write two or more accumulated program commands and/or program data corresponding to the two or more accumulated program commands from a data latch 504 to a memory device 502 at the same time, substantially the same time, and/or at least two data program commands and/or their corresponding program data may be transmitted/transferred at different times, among other combinations that are possible and contemplated herein. In additional or alternative embodiments, two or more data latches 504 can transfer, transmit, and/or write one or more of their respective accumulated program commands and/or program data corresponding to their accumulated program command(s) from the data latches 504 to a memory device 502 at the same time and/or at substantially the same time, among other combinations that are possible and contemplated herein.

An update circuit 812 may include any suitable hardware and/or software that is known or developed in the future capable of updating and/or modifying data in an FTL 712. In various embodiments, data in an FTL 712 may be updated and/or modified to locate, identify, and/or indicate information related to the program command(s) and/or program data that are currently being stored in the memory device 502, one or more data latches 504 in one or more sets of data latches 504, and/or the command queue 806. Further, an FTL 712 may be updated and/or modified in response to a change in the location, status, and/or identity of a program command and/or program data, among other characteristics that are possible and contemplated herein.

An interrupt/resume circuit 814 may include any suitable hardware and/or software that is known or developed in the future capable of interrupting and/or initiating the resumption of the open mode operations performed by the open mode circuit 704. In some embodiments, an interrupt/resume circuit 814 can interrupt the open mode operations and/or exit the open mode in response to determining and/or detecting one or more trigger events.

The open mode operations may be interrupted and/or the open mode may be exited in any suitable manner that pauses, stops, and/or otherwise results in at least temporarily ceasing to perform program commands and/or program operations (e.g., write operations). In some embodiments, an interrupt/resume circuit 814 can interrupt the open mode operations by sending one or more commands to the command circuit 804, transfer circuit 808, write circuit 810, and/or update circuit 812 instructing the circuit(s) to stop, cease, and/or at least temporarily pause performing its/their respective operation(s). In additional or alternative embodiments, an interrupt/resume circuit 814 can exit the open mode by sending a command to a handshake circuit 804 instructing the handshake circuit 804 to disengage, stop, cease, and/or at least temporarily pause communications with a host computing device 110.

To determine/detect the trigger event(s), an interrupt/resume circuit 814 may be coupled to and/or in communication with a host computing device 110, a memory device 502, and/or a controller (e.g., a memory controller 126, a controller 244, a die controller 220, and/or the like). A trigger event may be any suitable event and/or set of circumstances for which a GC operation and/or technique can be used to eliminate, alleviate, or at least reduce one or more adverse effects related to such event and/or set of circumstances. Example trigger events include, but are not limited to, a host write block (e.g., a single level cell (SLC)) being full, substantially full (e.g., including less than about ten percent (10%) and/or less than about 10 KB of available space, among other percentages and/or quantities that are possible and contemplated herein), and/or including greater than or equal to a threshold amount of program data (e.g., five hundred kilobytes (500 KB) of program data for a host write block including a size of five hundred twelve kilobytes (512 KB), among other quantities of program data and/or sizes for a SLC host write block that are possible and contemplated herein)), a fold destination block (e.g., an SLC) being one of full substantially full (e.g., including less than about 10% and/or less than about 10 KB of available space, among other percentages and/or quantities that are possible and contemplated herein), and/or including greater than or equal to a threshold amount of program data (e.g., 500 KB of program data for a fold destination block including a size of 512 KB, among other quantities of program data and/or sizes for a SLC host write block that are possible and contemplated herein)), program data subject to a GC operation being accumulated to greater than or equal to a GC threshold amount (e.g., less than or equal to a predetermined quantity, percentage, and/or amount of available memory space in a memory device 502 (e.g., an amount of available memory space in the range of about 10% to about twenty-five percent (25%), less than about ten gigabytes (10 GB) of available memory space, etc., among other percentages and/or quantities that are possible and contemplated herein), less than or equal to a threshold quantity and/or amount of available memory blocks, pages, cells, and/or addresses (logical and/or physical) (e.g., less than about ten available memory blocks, pages, cells, and/or addresses, etc.), one or more program operation failures (e.g., write operation, read operation, erase operation, etc. failure(s) and/or a failure occurring during folding operations), and/or a GC counter including a count greater than or equal to a predetermined value in which the GC counter is incremented one count in response to each program command and/or a program operation corresponding to a program command being performed on a memory device 502, etc., among other events and/or circumstances that are possible and contemplated herein.

In various embodiments, an interrupt/resume circuit 814 is coupled to and/or in communication with a GC circuit 706 and can determine and/or detect the completion of GC operations on a memory device 502. In additional or alternative embodiments, an interrupt/resume circuit 814 can receive an indication/signal from the GC circuit 706 that GC operations performed on a memory device 502 are complete.

An interrupt/resume circuit 814, in various embodiments, can initiate resumption of open mode operations in response to determining/detecting and/or receiving an indication that GC operations performed on a memory device 502 are complete. In some embodiments, an interrupt/resume circuit 814 can initiate resumption of open mode operations by pinging and/or sending a command to a handshake circuit 802 instructing the handshake circuit 802 to initiate communications (e.g., set up a data path) between an open mode circuit 704 and a host computing device 110 so that the open mode operations can be resumed.

Referring again to FIG. 7A, a GC circuit 706A may include any suitable hardware and/or software that is known or developed in the future capable of performing one or more management operations to reclaim memory space (e.g., memory blocks, pages, objects, addresses (physical and/or logical), etc.) in a memory device 502 that is not being utilized. That is, a GC circuit 706A may implement any garbage collection operations, algorithm, and/or technique that is known or developed in the future.

Various GC operations, algorithms, and/or techniques can reclaim invalid data, blocks, pages, memory space, and/or cells, etc. in a particular order based on one or more suitable metrics. Example metrics upon which GC operations may be based on include, but are not limited to, age (e.g., oldest to youngest), size (e.g., largest to smallest), and/or quantity of invalid data (e.g., largest to smallest), etc., among other metrics that are possible and contemplated herein. Further, various GC operations can make available or free-up blocks, pages, memory space, and/or cells, etc. by performing block erase operations and/or block exchange operations, among other operations that are possible and contemplated herein. In various additional or alternative embodiments, GC operations can include flushing the FTL 712 to the memory device 502 (since the SLCs 506 and data latch/latches 504 are free from host writes), freeing and closing blocks or sets of SLCs 506, and/or check the integrity of one or more written blocks of program data.

A controller 708A may include any suitable hardware and/or software that is known or developed in the future capable of managing memory operations on the memory 702A and/or performing (or facilitating) the operations of the open mode circuit 704A and the GC circuit 706A. For instance, the controller 708A can perform and/or facilitate performance of the open mode operations defined by the operations of the various embodiments of and/or functions of the handshake circuit 802, command circuit 804, command queue 806, transfer circuit 808, write circuit 810, update circuit 812, and/or interrupt/resume circuit 814. In additional or alternative embodiments, the controller 708A can perform and/or facilitate performance of the GC operations defined by the operations, algorithms, and/or techniques of the GC circuit 706A.

In various embodiments, a controller 708A periodically performs and/or facilitates performance of the operations, algorithms, and/or techniques of the GC circuit 706A when the open mode operations are not being performed and/or subsequent to exiting the open mode. That is, unlike the conventional memory devices discussed in the Background section of this paper, GC operations are not performed and/or facilitated by the controller 708A and/or the GC circuit 706A on the memory device 502 after every write command (e.g., program command) that writes program data to the memory device 502 from the data latch/latches 504. Instead, various embodiments of the controller 708A and/or the GC circuit 706A perform and/or facilitate performance of the GC operations, algorithm(s), and/or technique(s) in response to a trigger event that causes the open mode to be exited and/or performance of the open mode operations to be at least temporarily stopped. Accordingly, because the GC operations are periodically performed (e.g., not performed after every program command and/or corresponding program operation and/or performed in response to a trigger event), the GC operations can be considered delayed GC operations, paused GC operations, GC operations subject to a delay or pause, GC operations subject to program operations, periodic GC operations, triggered GC operations, event GC operations, and/or trigger event GC operations.

Periodically performing GC operations and/or by delaying GC operations (e.g., not performing GC operations after every program command and/or corresponding program operation and/or performing in response to one or more trigger events), the various embodiments discussed herein can be and/or can provide more effective and/or efficient garbage collection compared to contemporary memory devices. For example, periodic and/or delayed GC operations can increase the quantity and/or amount of data, blocks, pages, and/or memory space that become invalid between cycles of GC operations. As a result, a greater quantity and/or amount of data, blocks, pages, memory space can be reclaimed during a cycle of GC operations, which can more effectively and/or efficiently reduce the quantity and/or amount of invalid data, blocks, pages, and/or memory space per cycle, which can be a more efficient use of bandwidth.

In another example, periodic and/or delayed GC operations can increase the amount of time spent in the open mode executing program commands and/or performing program operations because the quantity of data paths that are set up each time the open mode is resumed after being exited to perform GC operations is decreased. That is, because setting up data paths takes time, decreasing the quantity of data paths that are setup can result in an overall reduction in the amount of time spent by the handshake circuit 802 establishing communications with the host computing device 110 since fewer data paths are being setup during a particular period of time, which can be a more efficient use of system/device resources, bandwidth, and/or time and can also be considered a reduction of firmware latency.

Referring again to FIG. 7B, FIG. 7B is a schematic block diagram of another embodiment of a streamed write component 150B. At least in the illustrated embodiment, the streamed write component 150B includes, among other components, a controller 708B including a memory 702B storing an open mode circuit 704B and a GC circuit 706B. The memory 702B, open mode circuit 704B, GC circuit 706B, and controller 708B may be similar to the various embodiments of the memory 702A, open mode circuit 704A, GC circuit 706A, and controller 708A, respectively, discussed elsewhere herein. Further, the memory 702B, in some embodiments, includes RAM (e.g., DRAM, ReRAM, CBRAM, MRAM, and the like, and/or variations thereof) and can be referred to as controller RAM.

Figure 9:
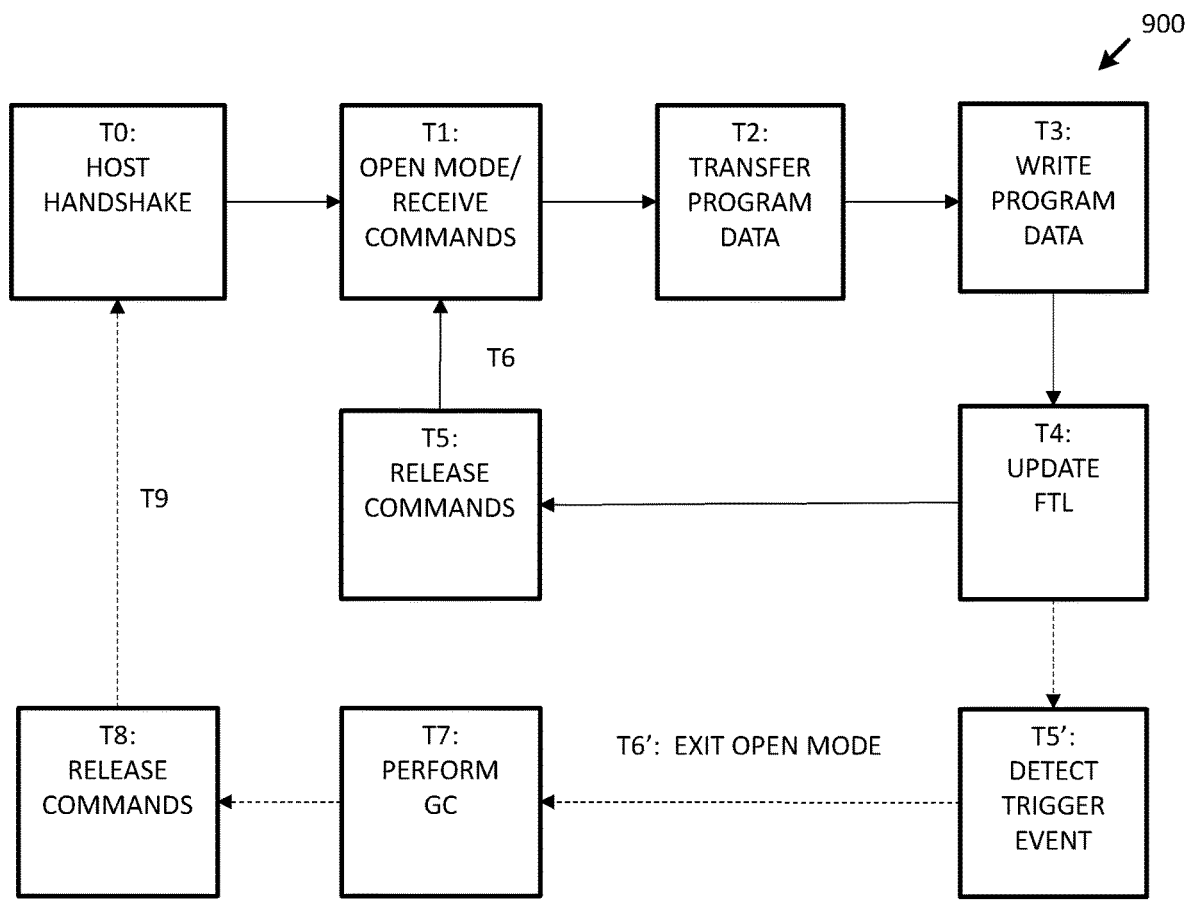
FIG. 9 is a timing diagram illustrating one embodiment of open mode operations of the open mode circuit of FIG. 8.

With reference now to FIG. 9, FIG. 9 is a timing diagram illustrating one embodiment of open mode operations 900 of an open mode circuit 704. At least in the illustrated embodiment, a handshake circuit 802 initiates communication with a host computing device 110 at an initial time (e.g., time T0).

At time T1, an open mode circuit 704 can enter an open mode and begin open mode operations by receiving a continuous stream of program commands. Also at time T1, a command circuit 804 can begin to accumulate the received stream of program commands in a command queue 806.

A transfer circuit 808, at time T2, can transfer program data corresponding to a quantity of accumulated program commands (e.g., 8 program commands) to one or more data latches 504 of a memory device 502. In response to a data latch 504 in the one or more data latches 504 being full, a write circuit 810 can write the program data to the memory device 502 at time T3 and, in response thereto, an update circuit 812 can provide updates to an FTL 712 at time T4, as discussed elsewhere herein. The command circuit 804 can release the program commands associated with the written program data at time T5 and, at time T6, the operations can return to the operations discussed with reference to time T1.

The interrupt/resume circuit 814 may detect a trigger event subsequent to time T4, which is identified as time T5' in this scenario. In response to the trigger event, the interrupt/resume circuit 814 may exit the open mode and/or interrupt/pause performance of open mode operations associated with the open mode at time T6'.

With the open mode exited and/or the open mode operations being interrupted, a GC circuit 706 performs GC operations at time T7. Upon completion of the GC operations, the command circuit 804 can release the program commands associated with the written program data at time T8 and, at time T9, the operations can return to the operations discussed with reference to time T0.

Figure 10:
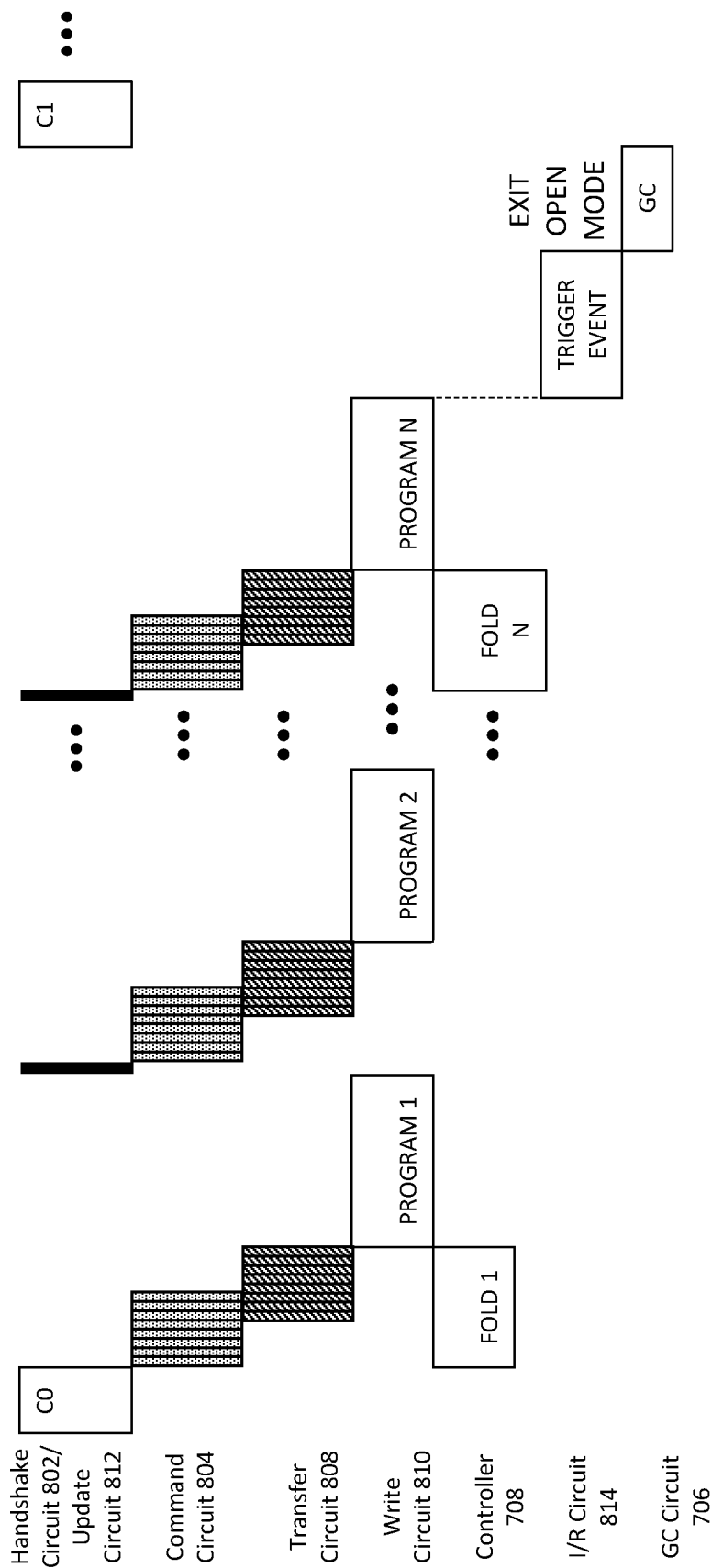
FIG. 10 is a diagram illustrating example activity and/or status of various components associated with an open mode circuit during performance of one embodiment of open mode operations.

Referring to FIG. 10, FIG. 10 is a diagram illustrating example activity and/or status of various components associated with an open mode circuit 704 during performance of one embodiment of open mode operations 1000. At least in the illustrated embodiment, a handshake circuit 802 initiates communication with a host computing device 110, which represents the beginning of an initial cycle C0 and an initial iteration I0 of cycle C0.

An open mode circuit 704, via a command circuit 804, can enter an open mode and begin open mode operations to receive a continuous stream of program commands and accumulate the received stream of program commands in a command queue 806, which are represented as program data 1002A in the command queue 806. Upon accumulating a quantity of program commands 1002A (e.g., 8 program commands), a transfer circuit 808 can transfer the program data 1002A to one or more data latches 504 of a memory device 502, which are represented as program data 1004A in the data latch/latches 504. In response to a data latch 504 in the one or more data latches 504 being full, a write circuit 810 can write (e.g., Program 1) the program data 1004A to the memory device 502, which are represented as program data 1006A in the memory device 502.

Further, folding operations (Fold 1) may be continuously, substantially continuously, and/or periodically performed by a controller 708 in the background. The folding operations may be shown as N/3 to represent a ratio of 3:1 in relocating program data from an SLC 506 to a multilevel cell 508 (a TLC in this example), meaning that the TLC includes triple to storage capacity of a SLC 506. In embodiments using MCLs and QLCs, folding operations may be shown as N/2 (e.g., a 2:1 ratio) and N/4 (e.g., a 4:1 ratio), respectively.

At the beginning of iteration I1, an FTL 712 is updated by an update circuit 812, which is represented by an amount of latency (L) between iterations I0 and I1. Iteration I1 includes continuing to receive and accumulate the continuous stream of program commands (represented as program commands 1002B in iteration I1), transfer the program data 1002B to one or more data latches 504 of the memory device 502 (which are represented as program data 1004B in the data latch/latches 504 in iteration I1), and Program 2 (e.g., write) the program data 1004B to the memory device 502 (which are represented as program data 1006B in the memory device 502 in iteration I1).

Further, folding operations may continue to be continuously, substantially continuously, and/or periodically performed in the background. For example, for a single die structure, folding operations may be performed every three program commands (e.g., the accumulation and/or programming of a lower page, middle page, and an upper page, or the like). In another example with two die, folding operations may be performed every six program commands (e.g., the accumulation and/or programming of two lower pages, two middle pages, and two upper pages, or the like).

Iterations I2 through IN are similar to iteration I1. Here, the number of iterations (N or IN) may be any suitable quantity of iterations for a particular cycle and/or a cycle in general. In various embodiments, N can be 64 iterations (and/or 64 writes/programs/) or 128 iterations (and/or 128 writes/programs) such that 512 or 1024 program commands, respectively, can be serviced in a cycle C, among other quantities of iterations, writes/programs, and/or program commands that are possible and contemplated herein.

In response to a trigger event, the open mode is exited and/or the open mode operations are paused and/or temporarily stopped, as represented by a lack of activity concurrent with the GC operations. In response to the open mode being exited and/or the open mode operations being paused and/or temporarily stopped, a GC circuit 706 can perform GC operations. Upon completing the garbage collection operations, a subsequent cycle C1 can begin and proceed from this point similar to cycle C0.

Figure 11:
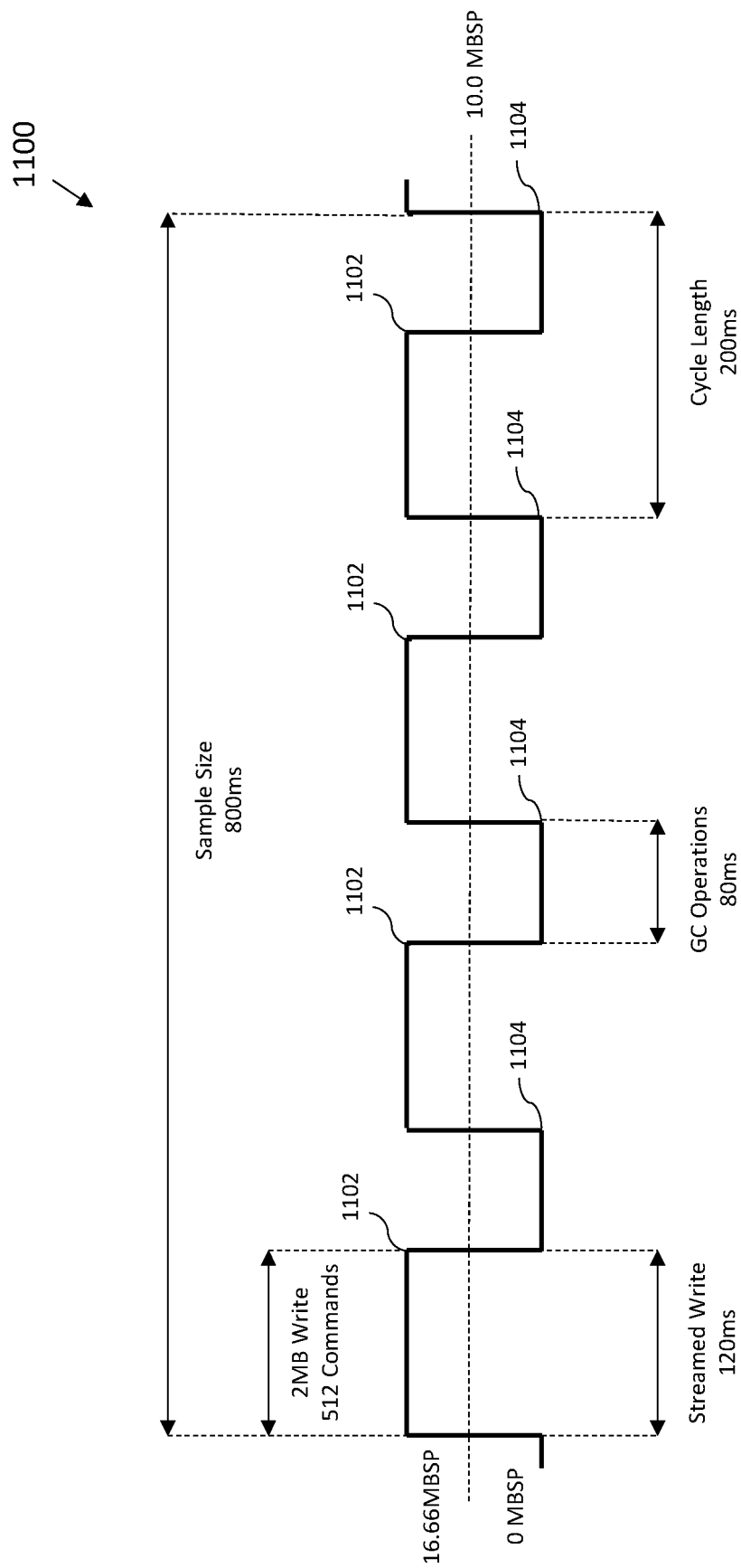
FIG. 11 is a diagram illustrating an example clock signal for one embodiment of open mode operations.

FIG. 11 is a latency diagram illustrating a clock signal 1100 of one embodiment of open mode operations of an open mode circuit 704. At least in the illustrated embodiment, each cycle C includes an open mode portion 1102 and a GC portion 1104, which are represented by the positive portions and negative portions of the clock signal 1100, respectively.

A cycle C may consume any suitable amount of time that can allow a continuous stream of program commands to be received/performed and GC operations to be performed on a memory device 502. In some embodiments, a cycle C consumes about two hundred milliseconds (200 ms), among other lengths of time that are possible and contemplated herein.

A cycle C may be divided between an open mode portion 1102 and a GC portion 1104 in any suitable amounts and/or percentages of time that can allow a continuous stream of program commands to be received/performed and GC operations to be performed on a memory device 502. In various embodiments, a cycle C may be divided equally or unequally between an open mode portion 1102 and a GC portion 1104. In one embodiment, an open mode portion 1102 is allocated and/or consumes sixty percent (60%) and a GC portion 1104 is allocated and/or consumes forty percent (40%) of a cycle C, among other lengths of time, percentages, and/or skewing (e.g., an open mode portion 1102 being allocated/consuming less time in a cycle C than a GC portion 1104) that are possible and contemplated herein.

An open mode portion 1102 of a cycle C may consume any suitable portion of a cycle C that can allow a continuous stream of program commands to be received and performed. In some embodiments, an open mode portion 1102 of a cycle C consumes about one hundred twenty milliseconds (120 ms), among other lengths of time that are possible and contemplated herein.

A GC portion 1104 of a cycle C may consume any suitable portion of a cycle C that can allow performance of GC operations, algorithm(s), and/or technique(s). In some embodiments, a GC portion 1104 of a cycle C consumes about eighty milliseconds (80 ms), among other lengths of time that are possible and contemplated herein.

Any suitable quantity of program commands may be received and/or accumulated during a cycle C that can allow a continuous stream of program commands to be received and performed, as discussed elsewhere herein. Further, any suitable quantity and/or amount of program data that can allow a continuous stream of program commands to be received and performed may be received during a cycle C. In various embodiments, about two megabytes (2 MB) of program data may be received during a cycle C, among other quantities and/or amounts that may be possible and are contemplated herein.

An open mode circuit 704 may achieve and/or include any suitable data transfer speed that can allow a continuous stream of program commands to be received/performed and GC operations to be performed on a memory device 502. In various embodiments, an open circuit 704 may achieve and/or include a data transfer speed of about 16.66 megabytes per second (MBPS).

Further, an open mode circuit 704 may achieve and/or include any suitable GC speed that can allow a continuous stream of program commands to be received/performed and GC operations to be performed on a memory device 502. In various embodiments, an open circuit 704 may achieve and/or include a GC speed of about 10.0 MBPS.

Figure 12:
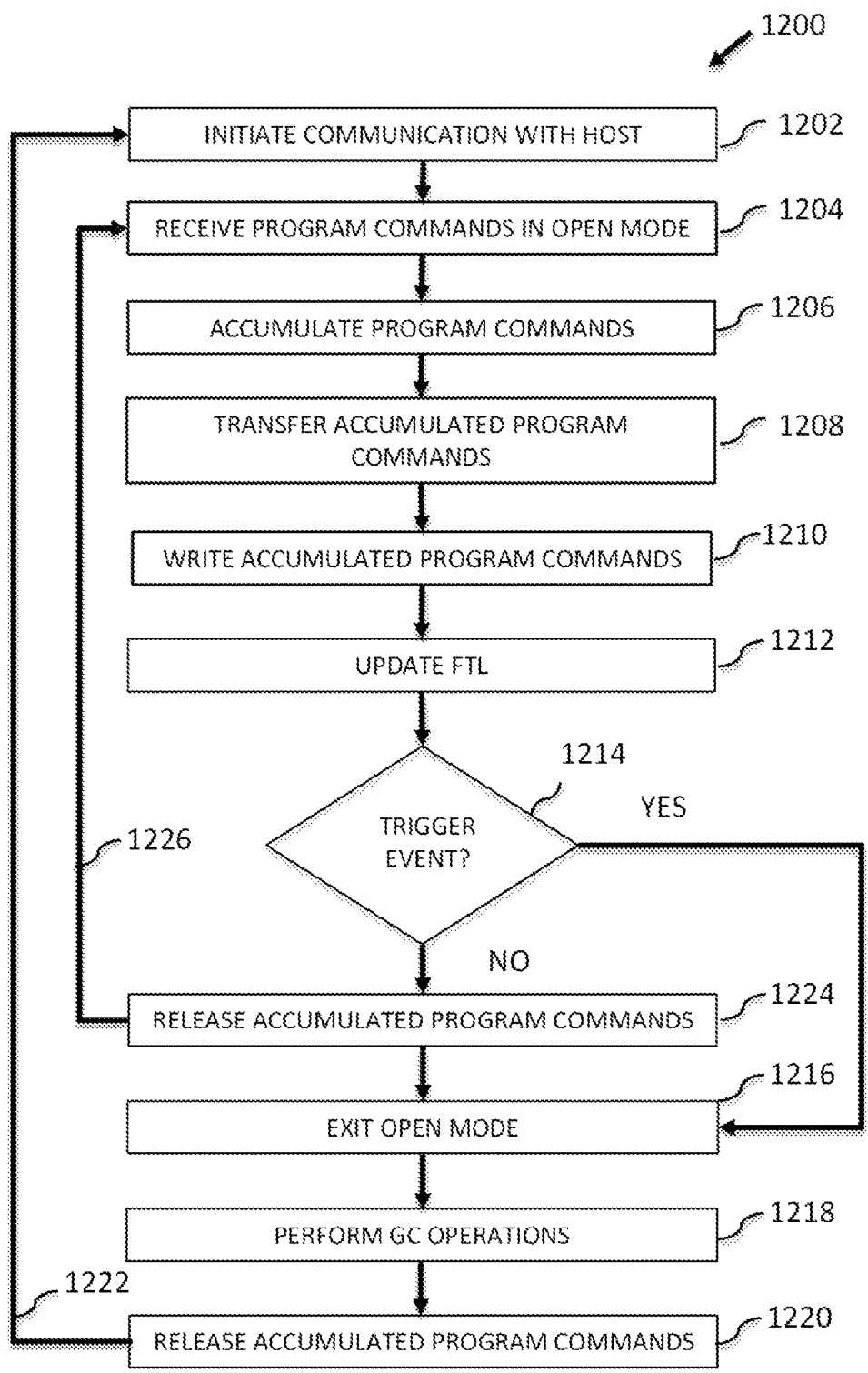
FIG. 12 is a schematic flow diagram of one embodiment of a method for streamed program commands with periodic garbage collection.

With reference to FIG. 12, a schematic flow diagram of one embodiment of a method 1200 for streamed program commands with periodic garbage collection is illustrated. At least in the illustrated embodiment, method 1200 begins by a handshake circuit 802 initiating communication with a host computing device 110 (block 1202).

An open mode circuit 704 enters an open mode to receive a continuous stream of program commands (block 1204). A command circuit 804 accumulates the received stream of program commands in a command queue 806 (block 1206).

A transfer circuit 808 transfers program data corresponding to a quantity of accumulated program commands (e.g., 8 program commands) to one or more data latches 504 of a memory device 502 (block 1208). In response to a data latch 504 in the one or more data latches 504 being full, a write circuit 810 writes the program data to the memory device 502 (block 1210). In response to the program data being written to the memory device 502, an update circuit 812 updates an FTL 712 (block 1212).

An interrupt/resume circuit 814 can determine if a trigger event has occurred (block 1214), which may be any type of trigger event discussed elsewhere herein. In response to detecting a trigger event (e.g., a YES in block 1214), the interrupt/resume circuit 814 may exit the open mode and/or interrupt/pause performance of open mode operations associated with the open mode (block 1216).

In various embodiments, the open mode may be exited by flushing the latch 504 contents to a memory medium of the memory device 502, even if a program threshold for the die is not met. Here, exiting the open mode may ensure that the latch 504 is freed up prior to performing other operations (e.g., a GC operation).

In response to the open mode being exited and/or open mode operations being interrupted, a GC circuit 706 performs GC operations on the memory device 502 (block 1218). Upon completion of the GC operations, the command circuit 804 can release the program commands associated with the written program data (block 1220). The handshake circuit 802 can re-initiate communication with the host computing device 110 to re-enter the open mode and resume open mode operations at block 1202 (return 1222).

In response to a trigger event not being detected (e.g., a NO in block 1214), the command circuit 804 can release the program commands associated with the written program data (block 1224). In some embodiments, releasing the program commands includes continuing to operate in the open mode to determine whether the latch is full and is to be programmed to the die. Further, if the latch is not full, the latch may continue taking new open mode write commands. The method 1200 may continue receive the continuous stream of program commands at block 1204 (return 1226).

A means for a streamed write component 150, in various embodiments, may include one or more of a memory 702, an open mode circuit 704, a GC circuit 706, a controller 708, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for providing a streamed write component 150.

A means for open mode operations for the streamed write component 150, in certain embodiments, may include one or more of a streamed write component 150, a memory 702, an open mode circuit 704, a controller 708, a handshake circuit 802, a command circuit 804 including a command queue 806, a transfer circuit 808, a write circuit 810, an update circuit 812, an interrupt/resume circuit 814, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for open mode operations in the streamed write component 150.

A means for GC operations for the streamed write component 150, in certain embodiments, may include one or more of a streamed write component 150, a memory 702, a GC circuit 706, a controller 708, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for open mode operations in the streamed write component 150.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
   a controller for a memory device, the controller configured to:
   set up a data path between the controller and the memory device to initialize an open mode;
   perform a plurality of program operations on the memory device in the open mode using the set up data path; and
   in response to exiting the open mode, perform a garbage collection operation on the memory device,
   wherein:
   the controller exits the open mode in response to a counter being incremented to a predetermined value, and
   the counter is incremented in response to the controller performing each program operation of the plurality of program operations.

2. The apparatus of claim 1, wherein the controller is configured to perform the plurality of program operations without interruption for a garbage collection operation.

3. The apparatus of claim 1, wherein the controller is configured to exit the open mode in response to a trigger event, the trigger event comprising one or more of:
   an amount of data stored by a single level cell (SLC) block satisfying a threshold;
   an amount of data being accumulated for the garbage collection operation satisfying a threshold; and a failure of one or more of the plurality of program operations.

4. The apparatus of claim 3, wherein the SLC block comprises one or more of a host write block and a fold destination block.

5. The apparatus of claim 3, wherein, in response to the trigger event comprising the amount of data stored by the SLC block satisfying the threshold, the controller is configured to one of:
perform an erase operation on the SLC block and write new program data to the SLC block; and
perform an exchange operation to transfer valid program data stored in the SLC block to a different SLC block and write new program data to the SLC block.

6. The apparatus of claim 3, wherein the failure comprises a program failure for a folding operation.

7. The apparatus of claim 1, wherein, during the open mode, the controller is configured to:
receive program commands from a host computing device in communication with the controller; and
accumulate, in a command queue, a plurality of program commands received from the host computing device.

8. The apparatus of claim 7, further comprising a set of memory latches for the memory device, wherein:
the program commands include program data; and
during the open mode, the controller is configured to, in response to the command queue accumulating at least a predetermined quantity of program commands, transmit the program data for the accumulated plurality of program commands to one or more memory latches of the set of memory latches.

9. The apparatus of claim 8, wherein, during the open mode, the controller is configured to accumulate the transferred program data in the one or more memory latches until a memory latch of the one or more memory latches is one of full and includes at least a latch threshold amount of program data.

10. The apparatus of claim 9, wherein:
the controller further comprises a flash translation layer (FTL) configured to track program data stored in the one or more memory latches; and
during the open mode, the controller is configured to:
write the program data to the memory device in response to the memory latch being the one of full and including greater than or equal to the latch threshold amount of program data, and
update the FTL in response to writing the program data to the memory device.

11. The apparatus of claim 8, wherein the program data is continuously transmitted to the one or more memory latches.

12. The apparatus of claim 1, wherein the controller is further configured to:
set up a new data path between the controller and the memory device to reinitialize the open mode; and
perform an additional plurality of program operations on the memory device in the reinitialized open mode using the new data path.

13. A system comprising:
a memory device, comprising:
a memory array of memory elements; and
a set of memory latches for the memory array; and
a controller including a controller memory, the controller in communication with a host computing device and configured to:
receive memory commands including program data from the host computing device;
transmit the program data to one or more memory latches of the set of memory latches in a streaming write mode; and
in response to detecting a program failure for a folding operation:
exit the streaming write mode; and
in response to exiting the streaming write mode, perform a garbage collection operation on the memory array.

14. The system of claim 13, wherein:
the controller is further configured to:
in response to exiting the streaming write mode, pause transmitting the program data to the one or more memory latches in the streaming write mode, and
in response to completing the garbage collection operation:
set up a data path between the controller and the set of memory latches, and
resume transmitting the program data to the one or more memory latches in the streaming write mode.

15. The system of claim 14, wherein:
the program data is continuously transmitted to the one or more memory latches; and
in response to a memory latch in the one or more memory latches being one of full and including at least a predetermined latch amount of the program data, the controller is further configured to write the program data in the memory latch to the memory array.

16. The system of claim 13, wherein:
the controller is configured to exit the streaming write mode in response to a counter being incremented to a predetermined value; and
the counter is incremented in response to the controller transmitting the program data to the one or more memory latches of the set of memory latches.

17. An apparatus comprising:
means for transmitting program data to one or more memory latches of a set of memory latches for a memory array in an open mode;
means for exiting the open mode in response to detecting one or more trigger events; and
means for performing a garbage collection operation on the memory array in response to exiting the open mode, wherein:
the open mode is exited in response to a counter being incremented to a predetermined value, and
the counter is incremented in response to each program operation of the plurality of program operations being performed.

18. The apparatus of claim 17, further comprising means for detecting the one or more trigger events, wherein the one or more trigger events comprise one or more of:
a single level cell (SLC) host write block being one of full and including at least a host write threshold amount of program data;
an SLC fold destination block being one of full and including at least a fold destination threshold amount of program data;
program data subject to the garbage collection operation being accumulated to at least a garbage collection threshold amount; and
a program operation failure.

19. The apparatus of claim 17, wherein the one or more trigger events comprises at least a predetermined quantity of program data writes being performed on the memory array, the apparatus further comprising:

means for pausing transmission of the program data to the one or more memory latches in response to exiting the open mode;
means for setting up a data path between the means for transmitting and the set of memory latches in response to completing the garbage collection operation; and
means for resuming transmission of the program data to the one or more memory latches in response to setting up the data path.

20. The apparatus of claim 17, further comprising means for detecting a trigger event, wherein:
the trigger event comprises one or more of:
an amount of data stored by a single level cell block satisfying a threshold,
an amount of data being accumulated for the garbage collection operation satisfying a threshold, and
a failure of one or more program operations; and
the failure comprises a program failure for a folding operation.

* * * * *